(12) United States Patent
Li et al.

(10) Patent No.: US 11,819,932 B2
(45) Date of Patent: Nov. 21, 2023

(54) INTELLIGENT SWITCHING SYSTEM FOR SWITCHING INTERNAL COOLING AND EXTERNAL COOLING BASED ON MINIMAL QUANTITY LUBRICATION AND METHOD

(71) Applicants: Qingdao University of Technology, Qingdao (CN); Shanghai Jinzhao Energy Saving Technology Co., Ltd., Shanghai (CN); Shaanxi Jinzhao Aviation Technology Co., Ltd., Shaanxi Province (CN)

(72) Inventors: Changhe Li, Qingdao (CN); Xifeng Wu, Qingdao (CN); Yixue Han, Qingdao (CN); Naiqing Zhang, Qingdao (CN); Qidong Wu, Qingdao (CN); Huajun Cao, Qingdao (CN); Teng Gao, Qingdao (CN); Yanbin Zhang, Qingdao (CN); Min Yang, Qingdao (CN); Bingheng Lu, Qingdao (CN); Yuying Yang, Qingdao (CN); Xin Cui, Qingdao (CN); Xufeng Zhao, Qingdao (CN); Mingzheng Liu, Qingdao (CN); Dongzhou Jia, Qingdao (CN); Xiaowei Zhang, Qingdao (CN); Hao Ma, Qingdao (CN)

(73) Assignees: Qingdao University of Technology, Qingdao (CN); Shanghai Jinzhao Energy Saving Technology Co., Ltd., Shanghai (CN); Shaanxi Jinzhao Aviation Technology Co., Ltd., Shaanxi Province (CN)

( * ) Notice: Subject to any disclaimer, the term of this patent is extended or adjusted under 35 U.S.C. 154(b) by 337 days.

(21) Appl. No.: 17/406,746

(22) Filed: Aug. 19, 2021

(65) Prior Publication Data
US 2022/0143719 A1 May 12, 2022

(30) Foreign Application Priority Data

Nov. 9, 2020 (CN) .......................... 202011241667.2

(51) Int. Cl.
*B23C 5/28* (2006.01)

(52) U.S. Cl.
CPC ............ *B23C 5/28* (2013.01); *B23C 2250/12* (2013.01)

(58) Field of Classification Search
None
See application file for complete search history.

(56) References Cited

U.S. PATENT DOCUMENTS

| 3,718,757 A * | 2/1973 | Gulitz ..................... G01J 5/025 |
| | | 117/203 |
| 2019/0118323 A1* | 4/2019 | Koshiishi ........... B23Q 11/1015 |

\* cited by examiner

*Primary Examiner* — Sean Shechtman
(74) *Attorney, Agent, or Firm* — True Shepherd LLC; Andrew C. Cheng

(57) ABSTRACT

An intelligent switching system for switching internal cooling and external cooling and a method are provided. The system includes a vision system, a cooling system and a control system. The vision system monitors a real-time milling state of a cutter, collects a real-time milling depth image that the cutter mills a workpiece, and transmits the collected real-time milling depth image to the control system. The control system includes a lubrication mode control center, and a motor control center. The lubrication mode control center receives the real-time image transmitted by the image collection control center; analyzes and processes the real-time image to obtain real-time milling depth data of the cutter. The motor control center receives a signal sent by the lubrication mode control center; analyzes and processes the signal, and transmits a control instruction to the cooling system. The cooling system executes a switching command issued by the control system.

10 Claims, 18 Drawing Sheets

INTELLIGENT SWITCHING SYSTEM FOR SWITCHING INTERNAL COOLING AND EXTERNAL COOLING BASED ON MINIMAL QUANTITY LUBRICATION AND METHOD

CROSS REFERENCE TO RELATED APPLICATION

This patent application claims the benefit and priority of Chinese Patent Application No. 202011241667.2 filed on Nov. 9, 2020, the disclosure of which is incorporated by reference herein in its entirety as part of the present application.

TECHNICAL FIELD

The present disclosure relates to the field of metal cutting, and in particular, to an intelligent switching system for switching internal cooling and external cooling and method.

BACKGROUND ART

In machining, in order to take away heat from a cutter and a workpiece, cutting fluid must be used to cool a machining region. An incorrect cooling mode may reduce the machining quality and the cutter life. The cooling effect of the cutting fluid is realized by taking heat away from the cutter and the workpiece, through convection and vaporization between the cooling fluid and the cutter, cuttings and the workpiece which are heated by cutting. So, the cutting temperature is effectively decreased, the thermal deformations of the workpiece and the cutter are reduced, the hardness of the cutter is maintained, and the machining accuracy and the durability of the cutter is improved. The lubrication effect of the cutting fluid is realized via a partial lubrication film which is formed due to reducing friction between a front cutter surface and the cuttings, as well as friction between a rear cutter surface and a machined surface. So, a cutting force, friction and power consumption are reduced; the temperature of the surface of the cutter that rubs against a workpiece blank, as well as alleviate wear of the cutter are decrease; and the cutting machining performance of a workpiece material is improved. In addition, the cutting fluid also plays a role in cleaning the machining region, which can remove the generated cuttings, grindings, iron powder, greasy dirt and sand, and keep a cutting edge of the cutter sharp without affecting the cutting effect.

At present, cooling lubrication modes that are used in machine tools in a machining center include internal cooling and external cooling. In the cooling lubrication mode of the internal cooling, the cutting fluid is supplied by a cutting fluid supply system, flows into a rotary joint of a main spindle of the machine tool via a cutting fluid pipeline, then flows into an internal cooling pipeline of the main spindle of the machine tool from the rotary joint, and finally is transmitted to an internal cooling pipeline on the cutter. So, the cooling lubrication for the cutter is realized in a cutting process. The cooling lubrication mode of the internal cooling can satisfy the cooling lubrication in machining conditions such as milling deeper holes and grooves. However, the disadvantage of the cooling lubrication mode of the internal cooling is as follows: this cooling lubrication mode is only suitable for the cutting in specific machining conditions; and an internal cooling system is a system that comes with the machine tool to result in the relatively expensive price, which will cause economic waste without needing the internal cooling during machining. The cooling lubrication mode of the external cooling includes a pouring type cooling lubrication mode and a minimal quantity lubrication technology. For the pouring type cooling lubrication mode, the cutting fluid is generally supplied by the cutting fluid supply system, and flows into an external cooling nozzle via an external cooling pipeline, so as to cool and lubricate externally a machining region between the cutter and the workpiece. The cooling lubrication in this way can well cool and lubricate the machining region, and can also play a role in cuttings removal and the cutter cleaning. Compared with the cooling lubrication mode of the internal cooling, the pouring type cooling lubrication mode cannot satisfy the cooling lubrication in the machining conditions of milling deeper holes and grooves. In addition, the rate of the effective cooling lubrication of the cutting fluid in this mode is extremely low, and a large amount of cutting fluid is wasted, which will not only cause economic loss, but also affect the health of operators, since the cutting fluid contains substances that are harmful to human health.

Compared with the traditional pouring type cooling lubrication mode of the external cooling, the minimal quantity lubrication technology in the field of machining is more suitable for the concept of green manufacturing and sustainable development. The minimal quantity lubrication technology refers to a technology in which a minimal quantity of lubricating fluid, water and gas with a certain pressure are mixed and atomized, and then sprayed to a cutting region for the cooling lubrication. The water and the high-pressure gas play a cooling role, and the oil plays a role of lubricating the cutting region and prolonging the life of the cutter. A minimal quantity lubrication supply system can be generally divided into two types: a single-channel type and a dual-channel type. A difference between the two types is that the positions of aerosol formed by mixing air and lubrication oil are different. That is, the minimal quantity lubrication supply system is divided into two types according to differences in the transmission and atomization of a minimal quantity of cutting fluid. The characteristic of the single-channel type is that: air and lubrication oil have been mixed to form aerosol in generating equipment, and then the aerosol is conveyed to the machining region through a track inside a sprayer nozzle. The characteristic of the dual-channel type is that: air and lubrication oil are conveyed to a mixing cavity near a head of a machining shaft through different tracks to form aerosol, and the aerosol is then conveyed to the machining region. Compared with the dual-channel system, the single-channel system is beneficial to the manufacture. However, during conveying of the oil mist for the cooling lubrication, particularly in a rotating main-spindle under strong centrifugal action, the oil mist is easy to disperse, which often causes the non-uniform distribution of the oil mist in the machining region to affect the machining quality. Since there is a shorter distance to convey the formed aerosol to the machining region, the dual-channel type minimal quantity lubrication system has lubrication droplets smaller than that of the single-channel type, and has a better lubrication effect. So, the application range is wider. The minimal quantity lubrication technology has higher utilization rate of the cutting fluid and less pollution to the environment. However, like the pouring type cooling lubrication mode, the minimal quantity lubrication technology still has the problem of insufficient cooling lubrication for the machining region in the working conditions of machining and milling larger holes and grooves. For the improvements of the cooling lubrication modes of the internal cooling and the external cooling, researchers have made great progress at present. However, there are still many shortcomings in application.

Jin Hui et al., in Zhongjie Machine Tool Co., Ltd. invented a cycle switching system for switching internal cooling of a cutter and cooling of a main spindle in a five-axis machine tool (patent No. 201710434607.4). In the cycle switching system, a water tank uses a common pump group to connect a main working passage with an overflow valve, so as to protect pumps by overflowing of the overflow valve. The main working passage and a pipeline of the overflow valve are provided with symmetrical pressure difference detection assemblies. A group of solenoid valves for reversing are arranged at an outlet of the main working passage to communicate a pipeline used in an internal cooling cycle of the cutter or a cooling cycle of the main spindle, so as to control the water to flow out. The internal cooling cycle of the cutter or the cooling cycle of the main spindle is controlled to be opened and closed via the solenoid valve group on the respective pipelines. The operation of the solenoid valve group is controlled by a program. So, the automatic switching between the cutter internal cooling cycle and the spindle cooling cycle is realized. By means of editing the PLC program for controlling the water cooling, the system realizes the internal cooling of the cutter, when an internal cooling pump and a group of solenoid switching valve are simultaneously initiated; and realizes internal cooling cycle of a head of the main spindle, when a motor of the internal cooling pump is initiated only. So, two pumps are changed to one pump group, which reduces the number of control pipelines and valve groups, makes operation more stable, reduces failure points, and reduces production and maintenance costs.

Yuan Songmei et al., in Beihang University invented a minimal quantity lubrication system (patent No. 201720525491.0). The system includes a fluid supply subsystem, an air supply subsystem, and a nozzle. The fluid supply subsystem includes a fluid storage cavity and a spherical micropump which are communicated through a fluid inlet pipe. The spherical micropump is used to control an output of a lubricant in the fluid storage cavity. The nozzle is provided with a first input end, a second input end and a spray port. The spherical micropump communicates with the first input end of the nozzle through a liquid outlet pipe. The air supply subsystem communicates with the second input end of the nozzle. The minimal quantity lubrication system adopts the spherical micropump to accurately control a lubricant flow in a transmission pipeline of the minimal quantity lubrication system, so that the lubricant can reach the spray port of the nozzle from the fluid storage cavity accurately and quantitatively, and the lubricant is then atomized under the action of compressed air. In this way, it can overcome the shortcomings of the existing minimal quantity lubrication system in terms of the accurate control of the amount of the lubricant.

Lin Jingpeng et al., in Shanghai University of Engineering Science invented a minimal quantity lubrication device (patent No. 201810159390.5). The device includes a box body; a multi-point mixing mechanism arranged in the box body; and an oil supply mechanism and an air supply mechanism which are arranged on the box body. The multi-point mixing mechanism communicates with the oil supply mechanism and the air supply mechanism. This patent can disperse lubrication oil into multiple strands, and mix them with air from all directions. In this way, the problem in the full and uniform mixture of the lubrication oil and air can be solved; and the lubrication performance of the oil and air mixture is improved, thereby improving the machinability and reducing the production cost. Furthermore, the device is good in equipment flexibility, and is easy to install and maintain.

Although the above-mentioned device has made outstanding contribution to resource saving and lubrication performance, when workpieces with deeper holes and shallower grooves are machined on the machine tool at the same time, the external cooling still has the problem of the insufficient cooling lubrication. There still exists an uneconomical problem that a machine tool for the internal cooling still is used. The researchers thought that the external cooling can be switched to the internal cooling, while the original external cooling lubrication mechanism is unchanged by changing a handle structure of the cutter. When the internal cooling lubrication mode is needed in actual machining, the external cooling can be switched into the internal cooling by switching the cutter handle. So, the machine tool uses the internal cooling lubrication mode, while the cutter has the external cooling lubrication mode, so as to meet the needs of the actual machining. Now, researchers have conducted researches on this area and have achieved remarkable achievements.

Yan Bingjiang et al., in Huizhuan Green Tools Co., Ltd. invented a cutter handle and a cutter handle assembly of switching external cooling to internal cooling (patent No. 201910853806.8). The device includes a cutter handle body, a positioning ring, a bearing seat, a bearing, a positioning column, an elastic piece, and a cutter change block. When the cutter handle body needs to be assembled or removed, a manipulator grabs the cutter handle body, and makes the cutter handle body to enter into or withdraw from a main spindle, so as to enable the positioning column move downward or so as to downward act on the positioning column. A first snap part and the second snap part are released or snapped, to realize free rotation or limitation of the cutter handle body. Internal cooling lubrication is achieved by internally cooling the cutter. The device realizes the positioning through the first snap part of the positioning ring and the second snap part of the positioning column, so as to achieve the purpose of quickly replacing a cutter handle. So, the manual adjustment of nozzle's position or a spray angle is avoided, the efficiency is improved, the labor cost is reduced, and the stability of product quality is ensured.

Chen Yongqiang et al., in Centech-EG, Co., Ltd. invented a cutter handle structure of switching external cooling to internal cooling (patent No. 201521020079.0). The device includes a cutter handle, a water inlet sleeve, a joint, a positioning block, a positioning screw, and two sealing structures. The cutter handle is provided with a first water inlet hole. The water inlet sleeve is provided with a ring slot, a second water inlet hole, and two sealing slots. The ring slot is located on the inner side of the water inlet sleeve. The second water inlet hole communicates with the ring slot. The two sealing slots are respectively located on two sides of the ring slot. The water inlet sleeve is sleeved on the cutter handle. The ring slot communicates with the first water inlet hole. The positioning block is fixed. Two ends of the positioning screw are respectively connected with the positioning block and the water inlet sleeve. Two sealing structures are respectively arranged in the two sealing slots. The sealing structures avoid cooling water from flowing out from a gap between the water inlet sleeve and the cutter handle. One end of the joint is connected with the second water inlet hole, and the other end of the joint is connected to a hose. The device is simple in structure, which is beneficial to the manufacturing and the cost-saving.

Xiong Weiqiang et al., in Dongguan Anmolin Energy Saving and Environmental Protection Technology Co., Ltd. invented a cutter handle device of switching external cooling to internal cooling and a cutting device (patent No. 201320606428.1). The device includes a cutter handle. One end of the cutter handle is provided with a clamping hole for installing a cutter. The cutter handle is provided with a liquid inlet passage, and the liquid inlet passage communicates with the clamping hole. The cutter handle device also includes a switching device. The cutter handle is rotatably penetrated in the switching device. The switching device is internally provided with a cooling passage for circulating a cooling medium. The cooling passage communicates with the liquid inlet passage. The device can enable the cooling medium to pass through the cooling passage of the switching device into the liquid inlet passage of the cutter handle. Then, the cooling medium enters into the clamping hole. So, the continuous cooling of the clamped cutter is realized, so that the cutter can be cooled in time, the wear of the cutter is reduced, the cutter is avoided from being broken, and the efficiency and the machining accuracy are improved. The device is simple in structure, and is easy to operate, the normal machining of the machine tool is not affected, an internal cooling cutter can be normally used, and the machining efficiency is improved.

As for the above invention achievements by searching, the machine tool has the cooling lubrication mode of internal cooling and the cooling lubrication mode of external cooling, by switching the cooling lubrication mode of external cooling to the cooling lubrication mode of internal cooling. Furthermore, the switching between external cooling and internal cooling can be realized through a special structure. So, the cooling lubrication needs of machining workpieces with deeper holes and grooves are satisfied, and the cooling lubrication needs of machining workpieces with shallower holes or a shallower machining plane are also satisfied.

However, the inventors found that in actual machining of a machine tool, operators need to determine which cooling lubrication mode is required for the current machining based on their own experiences, so as to switch the cooling lubrication mode of internal cooling and the cooling lubrication mode of external cooling. So, there is a great boundedness. Further, the switching between the cooling lubrication mode of internal cooling and the cooling lubrication mode of external cooling needs to be manually performed, and internal cooling and external cooling are not intelligently switched, which wastes more human resources.

SUMMARY

For the above problems, the present disclosure is directed to provide an intelligent switching system for switching internal cooling and external cooling and method. The system collects milling depth data of a machine tool, transmits the milling depth data to a control center for data analysis and processing, and compares a reset switching threshold for the internal cooling and the external cooling. In this way, the most suitable cooling lubrication mode in a current machining condition of the machine tool is obtained. In addition, the control center may control an internal cooling system and an external cooling system according to obtained results, so as to realize intelligent switching between a cooling lubrication mode of internal cooling and a cooling lubrication mode of external cooling.

In order to achieve the foregoing objective, the present disclosure adopts the following technical solutions.

In a first aspect, the present disclosure provides an intelligent switching system for switching internal cooling and external cooling. The system includes a vision system, a cooling system and a control system; the vision system is configured to monitor a milling state of a cutter of a machine tool in real time, collect a real-time milling depth image that the cutter mills a workpiece, and transmit the real-time milling depth image that the cutter mills the workpiece to the control system through a first wireless transmission device; the control system comprises a lubrication mode control center, a second wireless transmission device, a motor control center and a third wireless transmission device; the lubrication mode control center is connected with the second wireless transmission device; the second wireless transmission device is configured to receive a real-time image transmitted by an image collection control center; the lubrication mode control center is configured to analyze and process the real-time milling depth image that the cutter mills the workpiece to obtain real-time milling depth data of the cutter, and configured to compare the real-time milling depth data with a preset milling depth threshold to obtain a lubrication mode in current a machining condition based on a comparative result; the third wireless transmission device is configured to receive a signal sent by the lubrication mode control center; the motor control center is configured to analyze and process the signal to obtain a control instruction; and the third wireless transmission device transmits the control instruction to the cooling system; the cooling system is configured to execute a command of switching the internal cooling and the external cooling sent by the motor control center, so as to realize the internal cooling and the external cooling for the machine tool.

Further, the vision system comprises a self-stabilization platform, and a camera, a lighting device, the image collection control center and the first wireless transmission device which are mounted on the self-stabilization platform; the camera is configured to photograph the real-time milling depth image of the cutter mills the workpiece; the camera is communicated with the image collection control center; the image collection control center is coupled with the first wireless transmission device; and the lighting device is mounted above the camera. The self-stabilization platform may adjust an absolute horizontal posture of the camera. So, the height stability of the camera is realized under a proper swing, so that the camera may always keep stable relative to a target object, thereby ensuring the stability of a photographed image. On one hand, the image collection control center may receive an instruction for starting a camera that is sent by the lubrication mode control center through the wireless transmission device, so as to control the camera to perform image photographing. On the other hand, the image collection control center is used to store image information photographed by the camera and wirelessly transmit the image information to the lubrication mode control center through the wireless transmission device.

Further, the cooling system comprises a cutting fluid storage device for the internal cooling and the external cooling, a reversing device, an internal cooling device, an external cooling device, and a compressed air storage device for the external cooling; the cutting fluid storage device for the internal cooling and the external cooling is connected with the internal cooling device and the external cooling device respectively through the reversing device; the external cooling device is further connected with the compressed air storage device for the external cooling; and the compressed air storage device for the external cooling is configured to convey compressed air to the external cooling device through a pipeline.

Further, the reversing device comprises a body; the body is provided with a cooling fluid main pipeline, an internal-cooling-device pipeline, an external-cooling device pipeline, and an overflow pipeline; the internal-cooling-device pipeline, the external-cooling device pipeline, and the overflow pipeline are communicated with the cooling fluid main pipeline; the cooling fluid main pipeline is communicated with the cutting fluid storage device for the internal cooling and external cooling; the internal-cooling-device pipeline and the external-cooling device pipeline are cooperated with a reversing block; and the reversing block is driven by a motor to close or open the internal-cooling-device pipeline and/or the external-cooling device pipeline.

Further, the cooling fluid main pipeline and the overflow pipeline are each mounted with a cutting fluid pressure adjustment device; the cutting fluid pressure adjustment device comprises a valve core, a spring, a pressure adjustment nut, and an adjustment bushing; the adjustment bushing has a thread, and is mounted on the body of the reversing device through the threaded; the pressure adjustment nut is mounted on the adjustment bushing; the adjustment screw, a spring seat, and the pressure adjustment spring are sequentially mounted in the adjustment bushing; and a tail end of the pressure adjustment spring is mounted on a spring base and is connected with the valve core. The pre-tightening force $F_{s1}$ of the pressure adjustment spring can be adjusted by adjusting the first pressure adjustment nut via the reversing device, and thus the pressure $p_2$ of the cutting fluid at the relief port can be adjusted. That is, pressures of the internal cooling passage and the external cooling passage. A pressure $p_2$ (i.e., overflow pressure) of the current cutting fluid is adjusted by adjusting the pre-tightening force $F_{s2}$ of the second pressure adjusting spring. By the adjustment of the overflow pressure, the overflow pressure can be less than the maximum pressure that the reversing device withstands, so as to achieve a protection effect on the reversing device.

Further, the internal cooling device comprises a rotary joint, an internal cooling plug, a plug inner-sleeve, and an internal cooling joint; the internal cooling plug is mounted in a machine-tool main spindle; the plug inner-sleeve is mounted in the internal cooling plug through inner-sleeve bearings; a right one of the inner-sleeve bearings is fixed at the plug inner-sleeve through a snap ring; the internal cooling joint is mounted in the machine-tool main spindle through a bearing internal-cooling-joint bearing; and the machine-tool main spindle is mounted in a housing of the machine-tool main spindle through a machine-tool main-spindle upper bearing and a machine-tool main-spindle lower bearing.

Further, the external cooling device comprises an X-axis telescopic arm module, a Y-axis telescopic arm module, a Z-axis telescopic arm module, and a sprayer-nozzle angle module; the Y-axis telescopic arm module is mounted on the X-axis telescopic arm module; the Z-axis telescopic arm module is mounted on the Y-axis telescopic arm module; and the sprayer-nozzle angle module is mounted on the Z-axis telescopic arm module.

In a second aspect, the present disclosure further provides a cooling method based on the above-mentioned intelligent switching system for internal cooling and external cooling. The method includes: receiving a machining instruction and controlling the vision system to operate via the lubrication mode control center at a beginning of machining; transmitting the real-time milling depth image that the cutter mills the workpiece to the lubrication mode control center via the vision system after the vision system operates; obtaining the real-time milling depth data of the cutter by analyzing and processing the real-time milling depth image that the cutter mills the workpiece; comparing the real-time milling depth data of the cutter with the preset milling depth threshold via the lubrication mode control center, wherein the preset milling depth threshold for switching an internal cooling lubrication mode and an external cooling lubrication mode is set in the lubrication mode control center; obtaining a lubrication mode in the current machining condition based on the comparative result via the lubrication mode control center; and transmitting the comparative result to the motor control center in a form of an analog signal via the lubrication mode control center; via the motor control center, receiving the analog signal that is transmitted by the lubrication mode control center, wherein the analog signal carries the lubrication mode required in the current milling condition; analyzing and processing the analog signal; controlling a rotation of a reversing device in manner of different quantities of pulse signals to control angle rotation of a reversing block of the reversing device of the cooling system, such that a switching of a flow direction of a cutting fluid between an internal-cooling-device pipeline and an external-cooling device pipeline is enabled, and a switching of the cooling system is enabled; enabling the cutting fluid to flow out from a cutting fluid storage device for internal cooling and external cooling; determining another flow direction of the cutting fluid between an internal cooling device and an external cooling device based on an open state or a close state of the internal-cooling-device pipeline and the external-cooling device pipeline in the reversing device, when the cutting fluid flows through the reversing device, wherein the open state or the close state is adjusted according to an actual machining condition; such that a switching of a most suitable lubrication mode in the current milling condition of the machine tool on the workpiece is enabled.

Further, collecting the real-time milling depth image that the cutter mills the workpiece via the vision system by using a machining-point optical identification system; acquiring position information of a top end of the cutter and position information of a surface of the workpiece when the cutter mills via the vision system, by identifying a light track of invisible light with a certain wavelength, wherein the invisible light is mapped to the cutter; calculating current coordinate data of a tail end of the cutter to obtain current milling depth information via the vision system, wherein the real-time milling depth image that the cutter mills the workpiece, which is collected by the vision system, is divided into two parts: a first part is a length $L_1$ from a handle of the cutter to a top end of the cutter, and an other part is a length $L_2$ from the handle of the cutter to the surface of the workpiece that is milled; a milling depth L of the workpiece that is milled by the machine tool is determined by $L=L_1-L_2$.

The present disclosure has the following beneficial effects.

1. In the present disclosure, an image is collected by the vision system; the collected image is analyzed and processed by the lubrication mode control center to obtain the current milling depth data; and the data is compared with the set milling depth threshold by the lubrication mode control center, so as to obtain the most suitable cooling lubrication mode in the current milling condition.

2. The lubrication mode control center of the present disclosure can send a signal of a corresponding lubrication mode to the motor control center based on the most suitable cooling lubrication mode in the current milling condition;

and the motor control center controls the angle rotation of a step motor in the reversing device by controlling the number of pulse signals to realize the intelligent switching between internal cooling and external cooling.

3. The reversing device of the present disclosure can adjust the pre-tightening force of the first pressure adjustment spring by adjusting a first pressure adjustment screw, so that the pressure of the cutting fluid at the relief port can be adjusted, i.e., pressures of the internal cooling passage and the external cooling passage; and the pre-tightening force of the second pressure adjustment spring is adjusted by adjusting the second pressure adjustment screw, so as to adjust the pressure of the current cutting fluid, i.e., the overflow pressure of the current cutting fluid. By the adjustment of the overflow pressure, the overflow pressure can be less than the maximum pressure that the reversing device withstands, so as to achieve a protection effect on the system.

4. The internal cooling and the external cooling of the present disclosure are intelligently switched, without manual switching between the internal cooling and the external cooling by workers in the working process of the machine tool, so that the labor is greatly saved.

BRIEF DESCRIPTION OF THE DRAWINGS

In FIG. 1: vision system I, internal cooling system II, external cooling system III, cutting fluid storage device II-1, reversing device II-2, internal cooling device II-3, compressed air storage device for external cooling III-1, and external cooling device III-2.

In FIG. 2: a camera I-1, a lighting device I-2, a self-stabilization platform I-3, an image collection control center I-4, first wireless transmission device I-5, lubrication mode control center I-6, second wireless transmission device I-7, motor control center I-8, third wireless transmission device I-9, bracket I-10, and vision-system bolt I-11.

FIG. 3: reversing-device upper seat II-2-1, reversing-device lower seat II-2-2, reversing block II-2-3, first adjustment bushing II-2-4, second adjustment bushing II-2-5, first pressure adjustment nut II-2-6, second pressure adjustment nut II-2-7, first adjustment screw II-2-8, second adjustment screw II-2-9, first spring seat II-2-10, second spring seat II-2-11, first pressure adjustment spring II-2-12, second pressure adjustment spring II-2-13, first spring base II-2-14, second spring base II-2-15, first valve core II-2-16, second valve core II-2-17, reversing motor II-2-18, reversing-block bearing II-2-3-1, reversing-device bolt gasket II-2-2-1, reversing-device bolt II-2-2-2, reversing-motor bolt gasket II-2-18-1, reversing-motor bolt II-2-18-2, and reversing-motor coupling II-2-18-3.

FIG. 4(a): reversing-device upper seat II-2-1, reversing-device lower seat II-2-2, second adjustment bushing II-2-5, reversing-device bolt; reversing-device bolt gasket II-2-2-1, and reversing-device bolt II-2-2-2; FIG. 4(b): reversing-motor bolt gasket II-2-18-1, reversing-motor bolt II-2-18-2, and reversing motor II-2-18; FIG. 4(c): first adjustment bushing II-2-4, first pressure adjustment nut II-2-6, and second pressure adjustment nut II-2-7;

FIG. 5: reversing block II-2-3, first adjustment bushing II-2-4, second adjustment bushing II-2-5, first adjustment screw II-2-8, second adjustment screw II-2-9, first spring seat II-2-10, second spring seat II-2-11, first pressure adjustment spring II-2-12, second pressure adjustment spring II-2-13, first spring base II-2-14, second spring base II-2-15, first valve core II-2-16, second valve core II-2-17, and reversing-block bearing II-2-3-1.

FIG. 7: reversing-device upper seat II-2-1, reversing-device bolt hole II-2-2-3, internal-cooling-device pipeline A, and external-cooling device pipeline B FIG. 8: reversing-device lower seat II-2-2.

FIG. 9: reversing-device lower seat II-2-2, and reversing-motor bolt hole II-2-18-4.

FIG. 10: machine-tool main-spindle housing II-3-2, machine-tool main-spindle upper end cover II-3-3, machine-tool main-spindle lower end cover II-3-4, lower-end-cover gasket II-3-5, machine-tool main spindle II-3-8, machine-tool main-spindle upper bearing II-3-15, and machine-tool main-spindle lower bearing II-3-16.

FIG. 11: rotary joint II-3-1, internal cooling plug II-3-6, plug inner-sleeve II-3-7, internal cooling joint II-3-9, cutter device II-3-10, lock nut II-3-11, inner-sleeve bearing II-3-12, snap ring II-3-13, internal-cooling-joint bearing II-3-14, and pipeline II-3-17.

FIG. 12: elbow joint II-3-1-1, connecting seat II-3-1-2, support seat II-3-1-3, rotary-joint bushing sleeve II-3-1-4, rotary-joint mandrel II-3-1-5, rotary-joint bolt II-3-1-7, rotary mandrel bearing II-3-1-6, rotary-joint bolt washer II-3-1-8, and rotary-joint bolt hole II-3-1-9.

FIG. 13: rotary mandrel bearing II-3-1-6, Y-sealing ring II-3-1-10, O-sealing ring II-3-1-11, end-surface sealing ring II-3-1-12, and pipeline II-3-17.

FIG. 14: X, Y, Z telescopic arm module III-2-1, and sprayer-nozzle angle module III-2-2.

FIG. 22: cutting fluid storage tank 1, hydraulic pump 2, pressure adjustment valve 3, throttle valve 4, overflow valve 5, cutting fluid recovery tank 6, air compressor 7, filter 8, air storage tank 9, pressure gauge 10, pressure adjustment valve 11, throttle valve 12, overflow valve 13, and compressed air recovery tank 14.

DETAILED DESCRIPTION OF THE EMBODIMENTS

It should be noted that the following detailed descriptions are all exemplary and are intended to provide a further understanding of the present disclosure. Unless otherwise specified, all technical and scientific terms used in the present disclosure have the same meaning as commonly understood by a person of ordinary skill in the art to which the present disclosure belongs.

It should be noted that terms used herein are only for describing specific implementation modes and are not intended to limit exemplary implementation modes according to the present disclosure. As used herein, the singular form is intended to include the plural form, unless the present disclosure clearly indicates otherwise. In addition, it should further be understood that terms "include" and/or "including" used in the present specification indicate that there are features, steps, operations, devices, assemblies, and/or combinations thereof.

The present disclosure is further described in detail below in combination with the accompanying drawings and specific embodiments.

Figure 1:
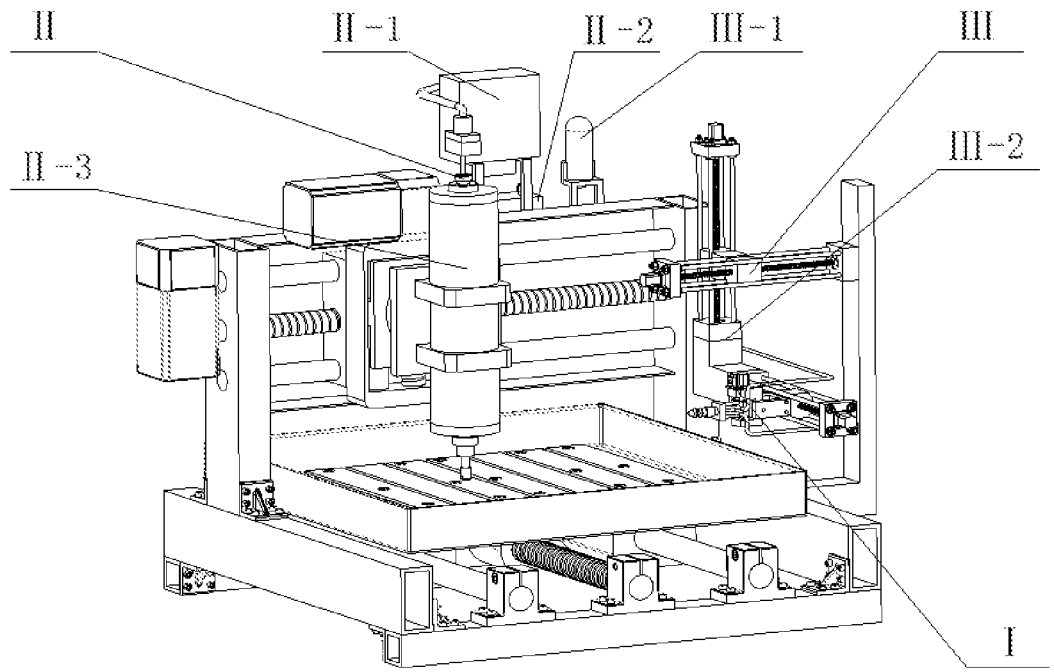
FIG. 1 is a distribution diagram of an intelligent switching system for switching internal cooling and external cooling on a machine tool.

The present disclosure is directed to provide an intelligent switching system for switching internal cooling and external cooling. The system collects milling depth data of a machine tool, transmits the milling depth data to a control center for data analysis and processing, and compares a preset switching threshold of internal cooling and external cooling to obtain the most suitable cooling lubrication mode in a current machining condition of the machine tool. In addition, the control center will control internal cooling and external cooling systems based on obtained results, so as to realize the intelligent switching between a cooling lubrication mode of internal cooling and a cooling lubrication mode of external cooling. The distribution of the system on the machine tool is as shown in FIG. 1. The system includes a vision system I, an internal cooling system II, and an external cooling system III. A cooling system includes the internal cooling system II and the external cooling system III.

Figure 2:
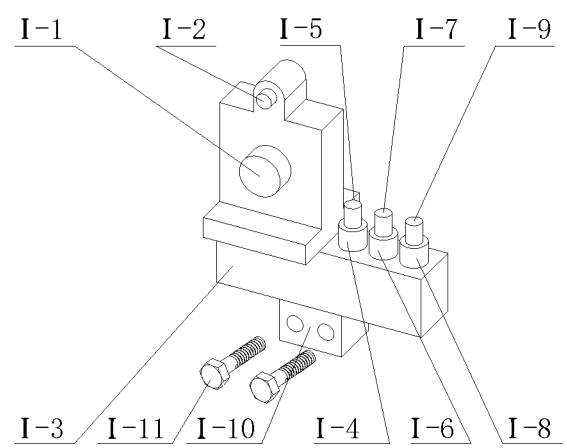
FIG. 2 is a general structural diagram of a vision system.

Further, the general structure of the above-mentioned vision system I is as shown in FIG. 2. The vision system I is used to monitor a milling state of a cutter of the machine tool in real time, collect a real-time milling depth image that a cutter mills a workpiece, and transmit the collected real-time milling depth image that the cutter mills a workpiece to the control system through a wireless transmission device. The vision system includes a camera I-1, a lighting device I-2, a self-stabilization platform I-3, an image collection control center I-4, and a first wireless transmission device I-5. The camera I-1 is used to photograph a real-time milling depth image that the cutter mills a workpiece, so as to collect the milling depth information of the cutter. The lighting device I-2 is used to illuminate the working condition. The purpose is to make images taken by the camera I-1 clearer and also meet the requirement for taking images under a dark working condition. The self-stabilization platform I-3 can automatically adjust an absolute horizontal posture of the camera I-1. So, the height stability of the camera I-1 is realized under a proper swing, so that the camera I-1 can always keep stable relative to a target object, thereby ensuring the stability of a photographed image. On one hand, the image collection control center I-4 may receive an instruction for starting a camera that is sent by the lubrication mode control center I-6 through the first wireless transmission device I-5, so as to control the camera I-1 to perform image photographing. On the other hand, the image collection control center is used to store image information photographed by the camera I-1 and wirelessly transmit the image information to the lubrication mode control center I-6 through the first wireless transmission device I-5.

Further, the self-stabilization platform I-3 is also provided with the lubrication mode control center I-6, a second wireless transmission device I-7, a motor control center I-8, a third wireless transmission device I-9, and a bracket I-10. The lubrication mode control center I-6, the second wireless transmission device I-7, the motor control center I-8, and the third wireless transmission device I-9 together form the control system. The self-stabilization platform I-3 is mounted on a sprayer-nozzle angle module III-2-2 through vision-system bolts I-11. The lighting device I-2 is mounted above the camera I-1. The first wireless transmission device I-5 is mounted on the image collection control center I-4.

The lubrication mode control center I-6 is mounted on the self-stabilization platform I-3. The lubrication mode control center I-6 receives the real-time milling depth image that the cutter mills the workpiece through the second wireless transmission device I-7. The lubrication mode control center I-6 analyzes and processes the real-time milling depth image that the cutter mills the workpiece to obtain real-time milling depth data of the cutter. A milling depth threshold for switching lubrication modes of internal cooling and external cooling is set in the lubrication mode control center I-6. The lubrication mode control center I-6 compares the real-time milling depth data of the cutter with the set milling depth threshold, obtains a lubrication mode under the current machining condition according to a comparative result, and transmits this result to the motor control center I-8 in the form of an analog signal through the second wireless transmission device I-7.

The motor control center I-8 is mounted on the self-stabilization platform I-3, and receives, through a third wireless transmission device I-9, the analog signal that is transmitted by the lubrication mode control center I-6, where the analog signal is carried with the lubrication mode required under a current milling condition. The motor control center I-8 may analyze and process the analog signal, and controls the angle of a reversing motor II-2-18 in a reversing device through the third wireless transmission device I-9 in a manner of controlling the number of pulse signals. The reversing motor II-2-18 controls the angle of a reversing block II-2-3 in the reversing device II-2 to realize switching of the flow direction of cutting fluid between an internal-cooling-device pipeline A and an external-cooling device pipeline B, and to realize switching of the internal cooling and external cooling systems. In this way, it is realized that a switching of a most suitable lubrication mode in the current milling condition of the machine tool on the workpiece.

It is not difficult to understand that, in other embodiments, the lubrication mode control center I-6, the second wireless transmission device I-7, the motor control center I-8, and the third wireless transmission device I-9 can also be mounted on other devices, which is specifically selected according to an actual situation.

Further, the above-mentioned internal cooling system II and the external cooling system III are mechanisms that used to execute a command of switching the internal cooling and the external cooling, where the command is issued by the control system. The internal cooling system includes a cutting fluid storage device II-1 for internal cooling and external cooling, a reversing device II-2, and an internal cooling device II-3. The external cooling system includes a cutting fluid storage device II-1 for internal cooling and external cold, a compressed air storage device for external cooling III-1, a reversing device II-2, and an external cooling device III-2. In this system, the internal cooling system II and the external cooling system III share the same reversing device II-2 and the same cutting fluid storage device II-1. The cutting fluid storage device II-1 is used to convey the cutting fluid through the reversing device II-2 to the internal cooling device II-3 and the external cooling device III-2. The compressed air storage device for external cooling III-1 is used to transfer compressed air to the external cooling device III-2 through a pipeline.

Figure 22:
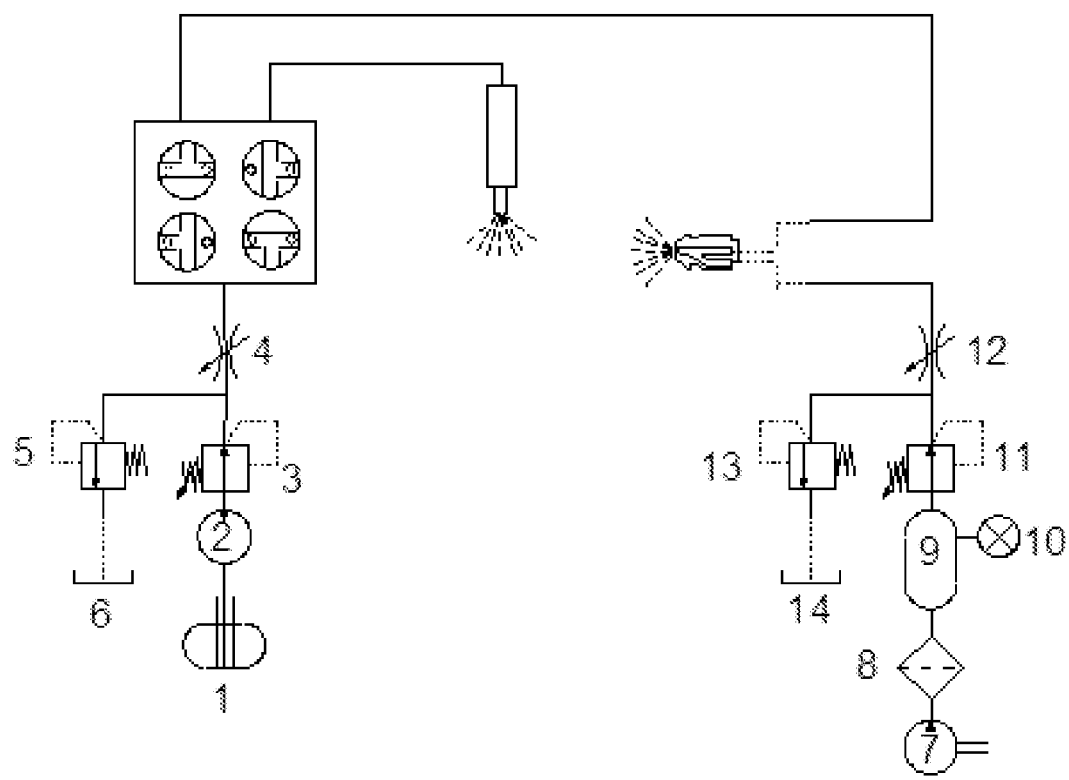
FIG. 22 is a schematic diagram of an intelligent switching system for switching internal cooling and external cooling.

Much further, the cutting fluid storage device II-1 for internal cooling and external cold is as shown in FIG. 22, and includes a cutting fluid storage tank 1, a hydraulic pump 2, a pressure adjustment valve 3, a throttle valve 4, an overflow valve 5, and a cutting fluid recovery tank 6. The cutting fluid storage tank 1 is connected to the hydraulic pump 2, the pressure adjustment valve 3, and the throttle valve 4 in turn through pipelines. At the same time, a branch is designed between the pressure adjustment valve 3 and the throttle valve 4. The overflow valve 5 is mounted on the branch, and the overflow valve 5 is connected to the cutting fluid recovery tank 6.

Much further, the compressed air storage device for external cooling III-1 is as shown in FIG. 22, and includes an air compressor 7, a filter 8, an air storage tank 9, a pressure gauge 10, a pressure adjustment valve 11, a throttle valve 12, an overflow valve 13, and a compressed air recovery tank 14. The air compressor 7 is connected to the filter 8, the air storage tank 9, the pressure adjustment valve 11, and the throttle valve 12 in turn. The air storage tank 9 is provided with the pressure gauge 10. A branch is provided between the pressure adjustment valve 11 and the throttle valve 12, and the branch is connected to the overflow valve 13. The overflow valve 13 is connected to the compressed air recovery tank 14.

Figure 3:
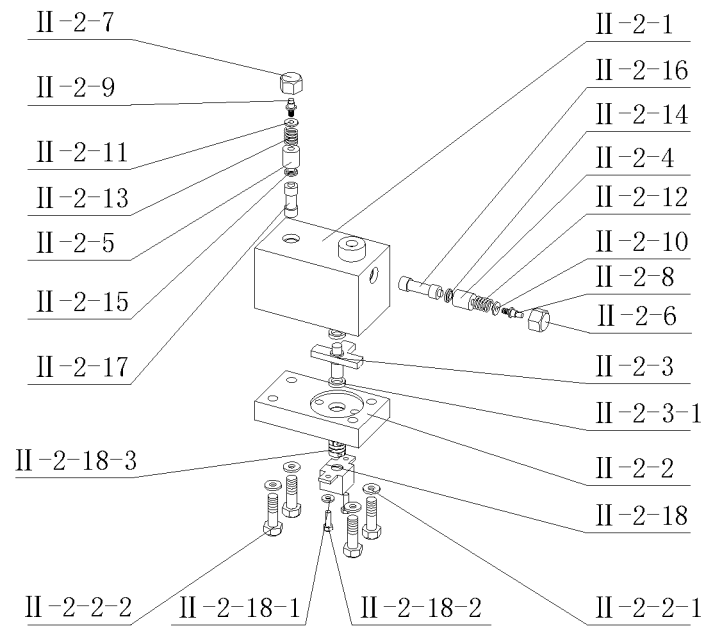
FIG. 3 is an exploded view of a reversing device.
Figure 4A:
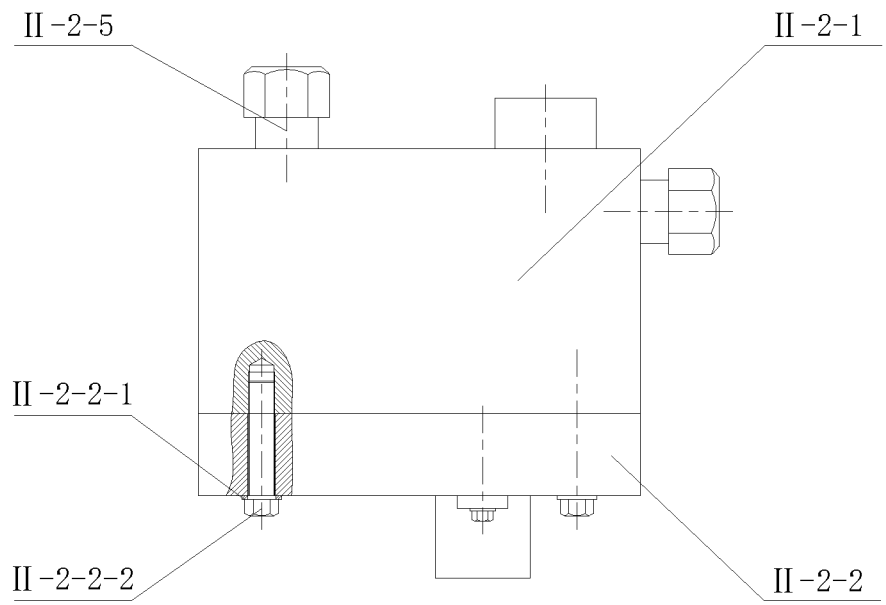
FIG. 4(a) is a front view of a reversing device.
Figure 4B:
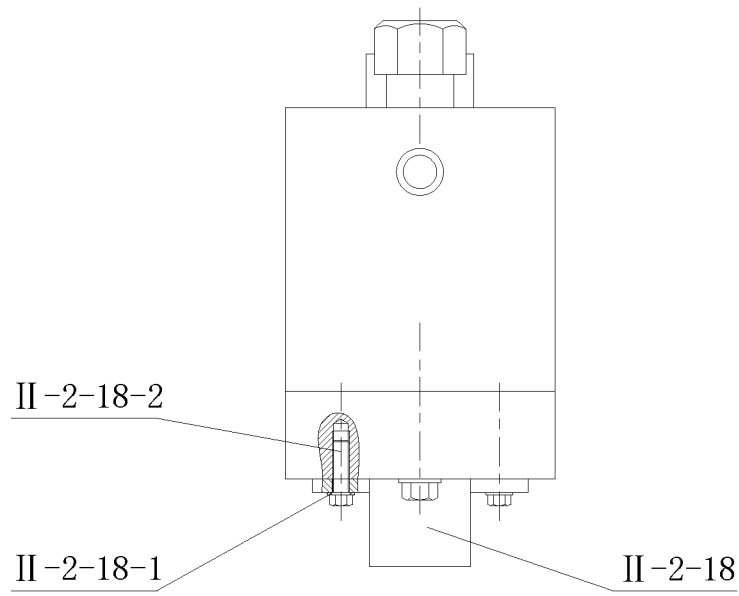
FIG. 4(b) is a side view of a reversing device.
Figure 4C:
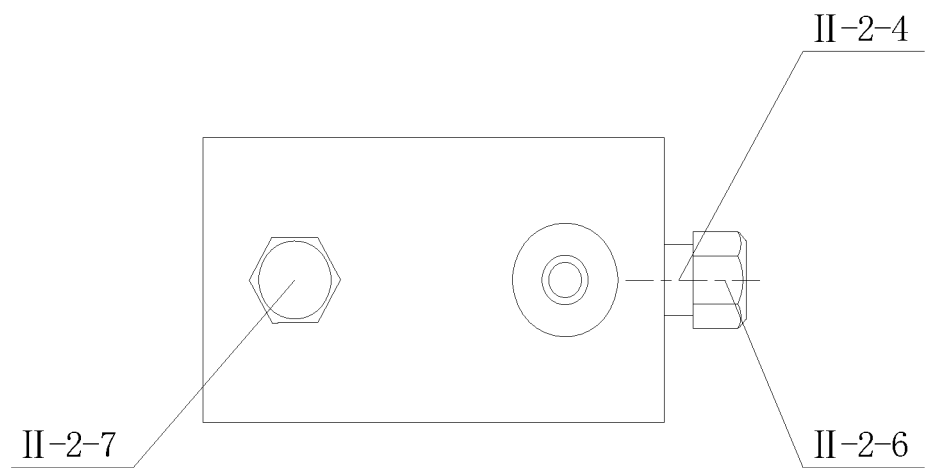
FIG. 4(c) is a top view of a reversing device.
Figure 5:
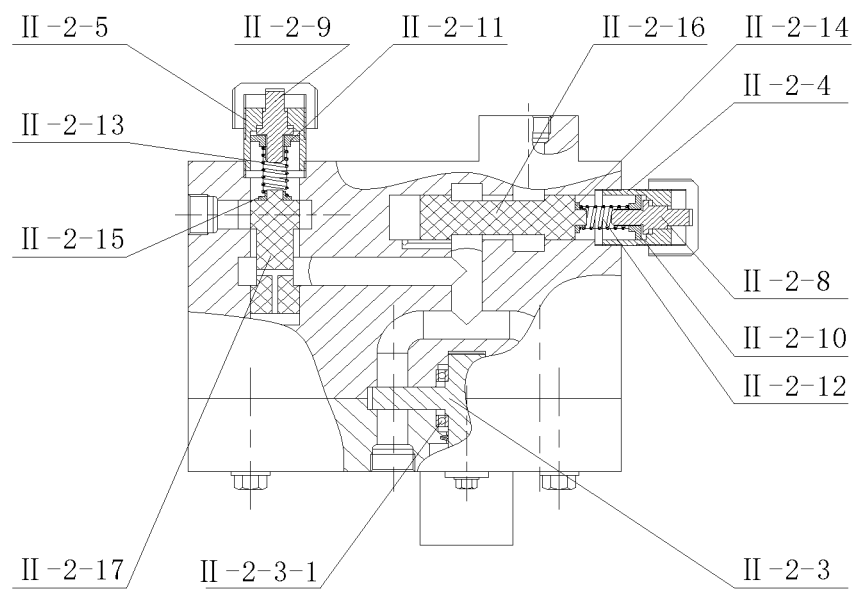
FIG. 5 is an internal assembly diagram of a reversing device.

Much further, FIG. 3 illustrates an exploded diagram of the above-mentioned reversing device II-2. The reversing device II-2 is a device used in the internal cooling and external cooling systems to enable the internal cooling and external cooling switching commands issued by the control system. The reversing device II-2 conveys the cutting fluid from the cutting fluid storage device II-1 for internal cooling and external cooling through a pipeline to the reversing device itself. Three views of the reversing device II-2 are as shown in FIG. 4(*a*), FIG. 4(*b*), and FIG. 4(*c*). The internal assembly of the reversing device II-2 is as shown in FIG. 5. The device includes a reversing-device upper seat II-2-1, a reversing-device lower seat II-2-2, a reversing block II-2-3, a first adjustment bushing II-2-4, a second adjustment bushing II-2-5, a first pressure adjustment nut II-2-6, a second pressure adjustment nut II-2-7, a first adjustment screw II-2-8, a second adjustment screw II-2-9, a first spring seat II-2-10, a second spring seat II-2-11, a first pressure adjustment spring II-2-12, a second pressure adjustment spring II-2-13, a first spring base II-2-14, a second spring base II-2-15, a first valve core II-2-16, a second valve core II-2-17, and a reversing motor II-2-18.

The reversing block II-2-3 is mounted in the reversing-device upper seat II-2-1 and the reversing-device lower seat II-2-2 through a reversing-block bearing II-2-3-1. The reversing-device upper seat II-2-1 and the reversing-device lower seat II-2-2 are connected together through reversing-device bolt gaskets II-2-2-1, reversing-device bolts II-2-2-2 and reversing-device bolt holes II-2-2-3. The first adjustment bushing II-2-4 and the second adjustment bushing II-2-5 have respective threads, and are mounted on the reversing-device upper seat II-2-1 through the threads. In the present embodiment, the mounting positions of the first adjustment bushing II-2-4 and the second adjustment bushing II-2-5 are perpendicular to each other. The orientation shown in FIG. 5 is taken as an example. The first adjustment bushing II-2-4 is mounted horizontally on the reversing-device upper seat II-2-1 and is located in an overflow passage. The second adjustment bushing II-2-5 is mounted vertically on the reversing-device upper seat II-2-1 and is located in a cutting fluid inlet passage. The first pressure adjustment nut II-2-6 and the second pressure adjustment nut II-2-7 are respectively mounted on the first adjustment bushing II-2-4 and the second adjustment bushing II-2-5. The first adjustment screw II-2-8, the first spring seat II-2-10 and the first pressure adjustment spring II-2-12 are mounted in the first adjustment bushing II-2-4 in sequence. The tail end of the first pressure adjustment spring II-2-12 is mounted on the first spring base II-2-14 and connected with the first valve core II-2-16. The second adjustment screw II-2-9, the second spring seat II-2-11 and the second pressure adjustment spring II-2-13 are mounted in the second adjustment bushing II-2-5 in sequence. The tail end of the second pressure adjustment spring II-2-13 is mounted on the second spring base II-2-15 and connected with the second valve core II-2-17.

The first adjustment bushing II-2-4, the first pressure adjustment nut II-2-6, the first adjustment screw II-2-8, the first spring seat II-2-10, the first pressure adjustment spring II-2-12, the first spring base II-2-14 and the first valve core II-2-16 form a cutting fluid decompression device in a cavity of the reversing-device upper seat II-2-1. The pressure of the cutting fluid in the cavity is adjusted by adjusting a pre-tightening force of the first adjustment screw II-2-8. The second adjustment bushing II-2-5, the second pressure adjustment nut II-2-7, the second adjustment screw II-2-9, the second spring seat II-2-11, the second pressure adjustment spring II-2-13, the second spring base II-2-15 and the second valve core II-2-17 form a cutting fluid overflow device in the reversing-device upper seat II-2-2. The maximum pressure of the cutting fluid in the cavity is controlled by the pre-tightening force of the second adjustment screw II-2-9 to play a role in protecting the reversing device.

The reversing motor II-2-18 is a step motor, and is mounted on the outer side of the reversing-device lower seat through the reversing-motor bolt gasket II-2-18-1, the reversing-motor bolt II-2-18-2, and the reversing-motor bolt hole II-2-18-3. The reversing motor II-2-18 is connected to one end of the reversing block II-2-3 through a reversing motor coupling II-2-18-3. The reversing motor II-2-18 is used as an actuator of the motor control center I-8, and performs angle rotation according to the number of received pulse signals. The reversing motor II-2-18 provides power for the reversing block II-2-3 to drive the reversing block II-2-3 to rotate in the reversing device II-2, thereby enabling the reversing block II-2-3 to switch the internal-cooling-device pipeline A and the external-cooling device pipeline B. The throttle valve 4 communicates with a cooling fluid main pipeline through a pipeline. The internal-cooling-device pipeline A communicates with the internal cooling device III-2 through a pipeline. The external-cooling device pipeline B communicates with the external cooling device III-2 through a pipeline.

Figure 6A:
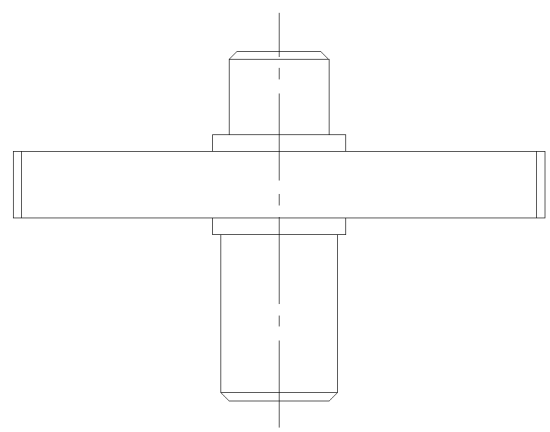
FIG. 6(a) is a front view of a reversing block.
Figure 6B:
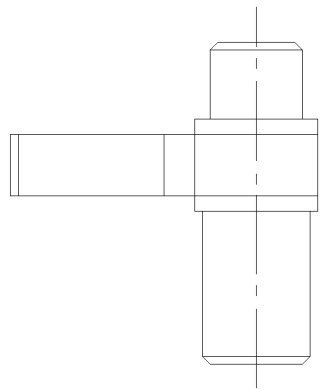
FIG. 6(b) is a side view of a reversing block.
Figure 6C:
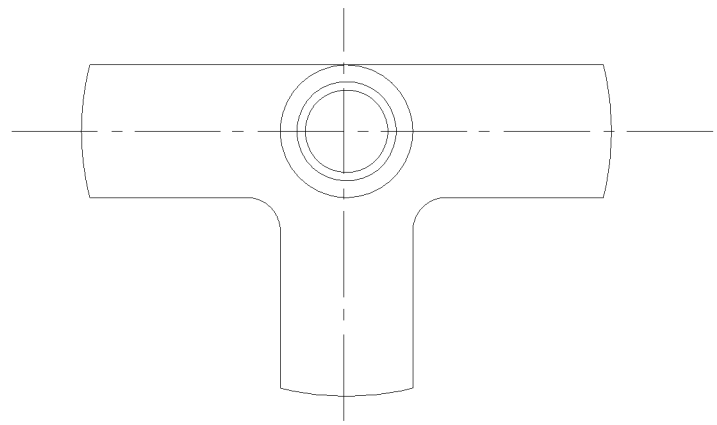
FIG. 6(c) is a top view of a reversing block.

Much further, three views of the above-mentioned reversing block II-2-3 are as shown in FIG. 6(a), FIG. 6(b), and FIG. 6(c). The reversing block includes a vertical part and three horizontal parts. The vertical part is connected with the reversing motor coupling II-2-18-3. During the rotation of the reversing block, the horizontal part cooperates with the internal-cooling-device pipeline A or the external-cooling device pipeline B to enable the reversing block II-2-3 to switch the internal-cooling-device pipeline A and the external-cooling device pipeline B.

Figure 7:
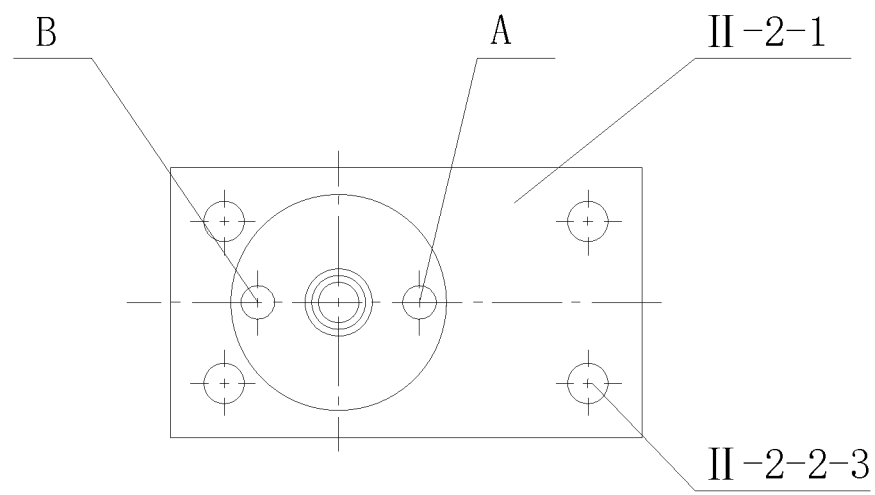
FIG. 7 is a view of a bottom of an upper seat of a reversing device.

Much further, the view of a bottom of the above-mentioned reversing-device upper seat II-2-1 is as shown in FIG. 7, which is a rectangular block as a whole. The internal-cooling-device pipeline A and the external-cooling device pipeline B are arranged in the rectangular block. Four bolt holes II-2-2-3 are also formed in the four corners of the rectangular block.

Figure 8:
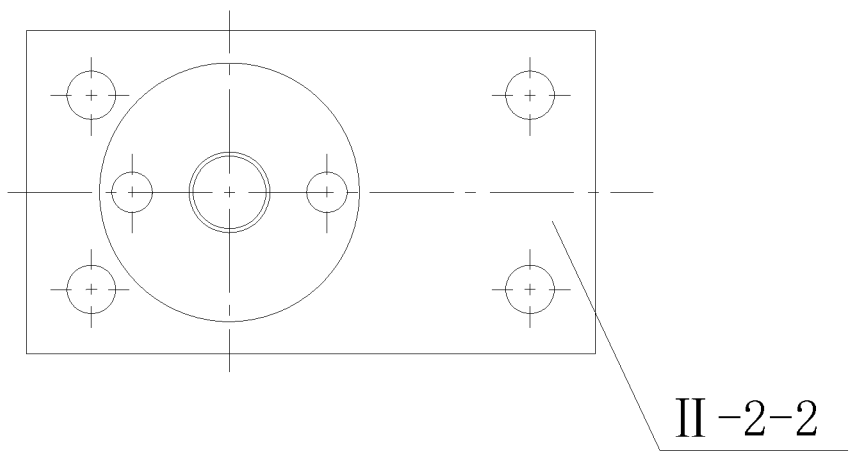
FIG. 8 is a top view of a lower seat of a reversing device.
Figure 9:
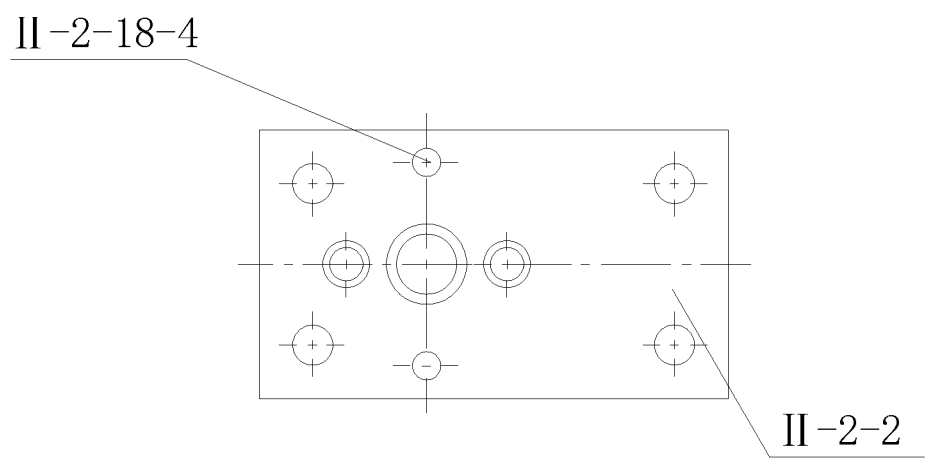
FIG. 9 is a view of a bottom of an upper seat of a reversing device.

Much further, a top view and a bottom view of the above-mentioned reversing-device lower seat II-2-2 are as shown in FIG. 8 and FIG. 9 respectively, and are each a rectangular block as a whole. Four bolt holes are also formed in the four corners of the rectangular block. A reversing-motor bolt hole II-2-18-4 is formed in the middle part of the rectangular block.

Figure 10:
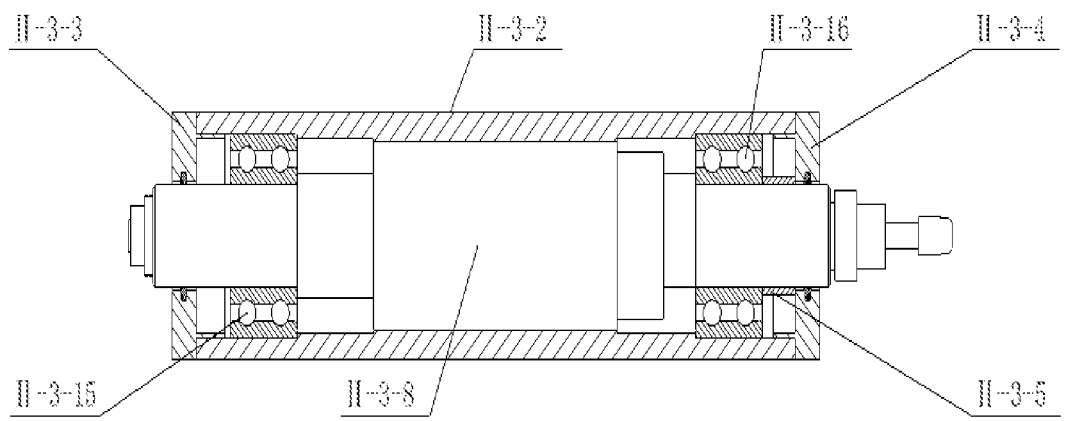
FIG. 10 is an assembly diagram of a main spindle of an internal cooling device.
Figure 11:
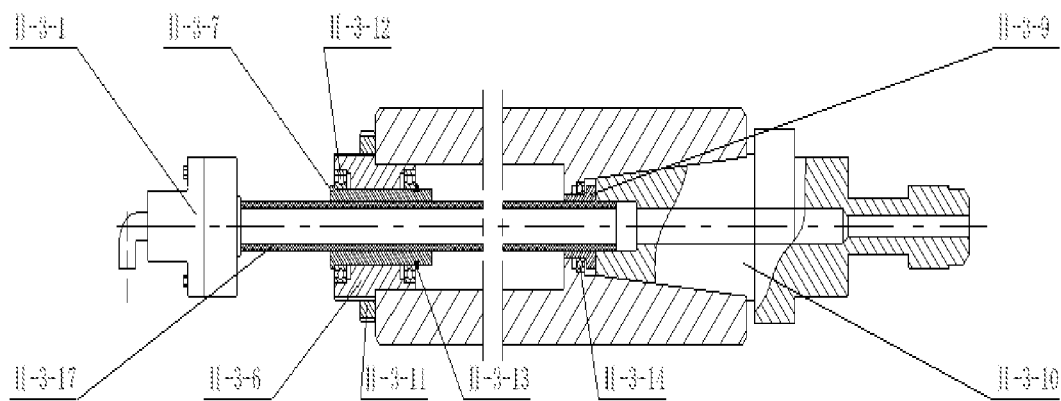
FIG. 11 is an assembly diagram of an interior of an internal cooling device.

Much further, an assembly diagram of a main spindle of the internal cooling device II-3 is as shown in FIG. 10, and an internal assembly diagram of the internal cooling device II-3 is as shown in FIG. 11. The internal cooling device II-3 conveys the cutting fluid from the reversing device II-2 through a pipeline II-3-17, and conveys the cutting fluid to a cutting fluid hole in the machine-tool main spindle II-3-8 and a cutting fluid hole in a cutter device II-3-10 through a rotary joint II-3-1, so as to make the cutting fluid finally flow out from a cutting fluid hole in the outer end of the cutter, thereby cooling the cutter and the machined workpiece. The internal cooling device II-3 includes the rotary joint II-3-1, a machine-tool main-spindle housing II-3-2, a machine-tool main-spindle upper end cover II-3-3, a machine-tool main-spindle lower end cover II-3-4, a lower-end-cover gasket II-3-5, an internal cooling plug II-3-6, a plug inner-sleeve II-3-7, a machine-tool main spindle II-3-8, an internal cooling joint II-3-9 and the cutter device II-3-10.

The internal cooling plug II-3-6 is mounted in the machine-tool main spindle II-3-8 through a lock nut II-3-11. The plug inner-sleeve II-3-7 is mounted in the plug through the inner-sleeve bearings II-3-12. A right one of the inner-sleeve bearings II-3-12 is fixed to the plug inner-sleeve II-3-7 by a snap ring II-3-13. The internal cooling joint II-3-9 is mounted in the machine-tool main spindle II-3-8 through the internal-cooling-joint bearing II-3-14. The machine-tool main spindle II-3-8 is mounted in the machine-tool main-spindle housing II-3-2 through a machine-tool main-spindle upper bearing II-3-15 and a machine-tool main-spindle lower bearing II-3-16. The cutter device II-3-10 is mounted on the main spindle II-3-8 according to the Morse's taper.

Figure 12:
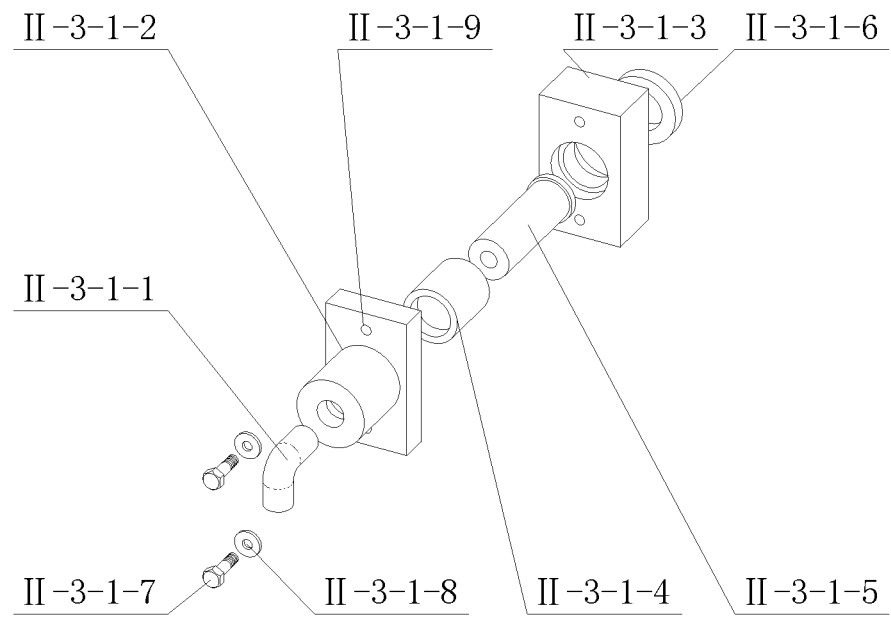
FIG. 12 is an exploded view of a rotary joint.
Figure 13:
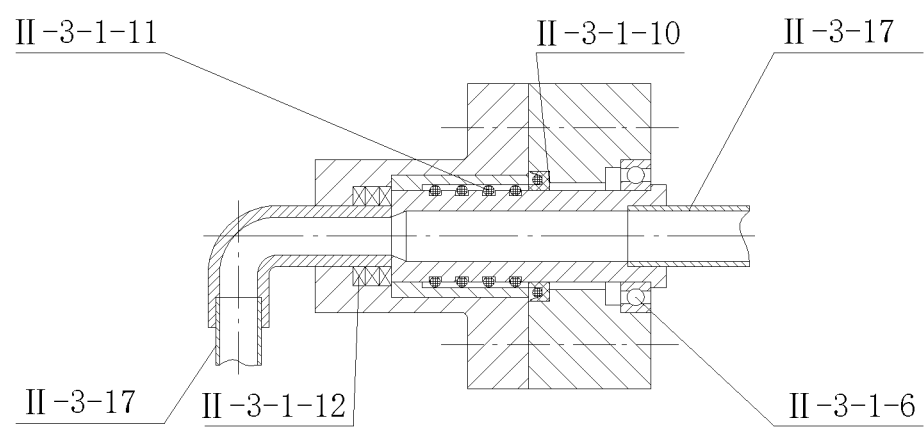
FIG. 13 is an assembly diagram of a rotary joint.

Much further, the exploded view of the rotary joint II-3-1 is as shown in FIG. 12. The rotary joint II-3-1 communicates with the plug inner-sleeve II-3-7 through a pipeline II-3-17. The rotary joint II-3-1 includes an elbow joint II-3-1-1, a connecting seat II-3-1-2, a support seat II-3-1-3, a rotary-joint bushing II-3-1-4, and a rotary-joint mandrel II-3-1-5. The assembly diagram of the rotary joint II-3-1 is as shown in FIG. 13. The rotary-joint mandrel II-3-1-5 with an O-sealing ring II-3-1-11 is mounted in the rotary-joint bushing II-3-1-4 and mounted on the support seat II-3-1-3 through a rotary mandrel bearing II-3-1-6. A Y-sealing ring II-3-1-10 is mounted between the support seat II-3-1-3 and the connecting seat II-3-1-2. The elbow joint II-3-1-1 is mounted on the connecting seat, and an end-surface sealing ring II-3-1-12 is mounted at a contact position therebetween. The connecting seat II-3-1-2 and the support seat II-3-1-3 are connected through rotary-joint bolts II-3-1-7, rotary-joint bolt washers II-3-1-8, and rotary-joint bolt holes II-3-1-9.

Figure 14:
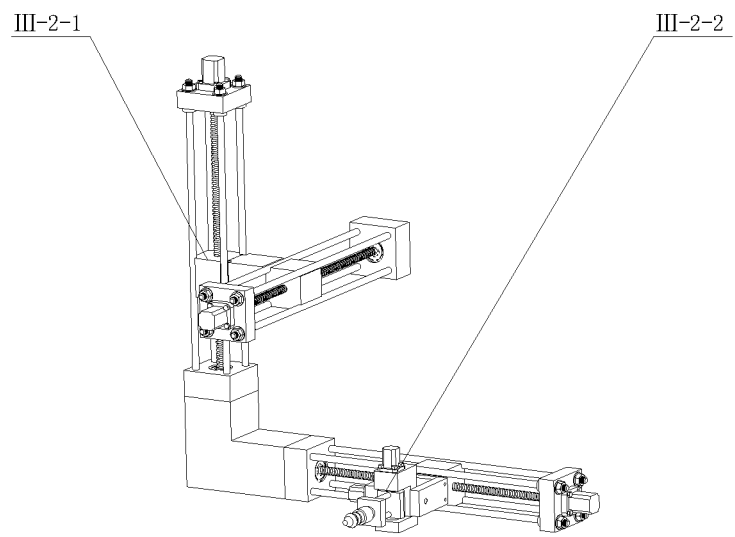
FIG. 14 is an overall structural diagram of an external cooling device.

Much further, the overall structure of the external cooling device III-2 is as shown in FIG. 14. The external cooling device III-2 is used to convey the cutting fluid to a sprayer nozzle device III-2-2-6 through a pipeline, and spray the cutting fluid through a nozzle, so as to cool the cutter and the machined workpiece. The external cooling device includes an X, Y, Z telescopic arm module III-2-1 and a sprayer-nozzle angle module III-2-2. The X, Y, Z telescopic arm module III-2-1 is used to adjust a positional relationship of the sprayer-nozzle angle module III-2-2 in the three directions of X-axis, Y-axis, and Z-axis. The vision system is connected and mounted on the sprayer-nozzle angle module III-2-2 through the bracket via vision-system bolts I-11 and bolt holes III-2-2-17.

Figure 15:
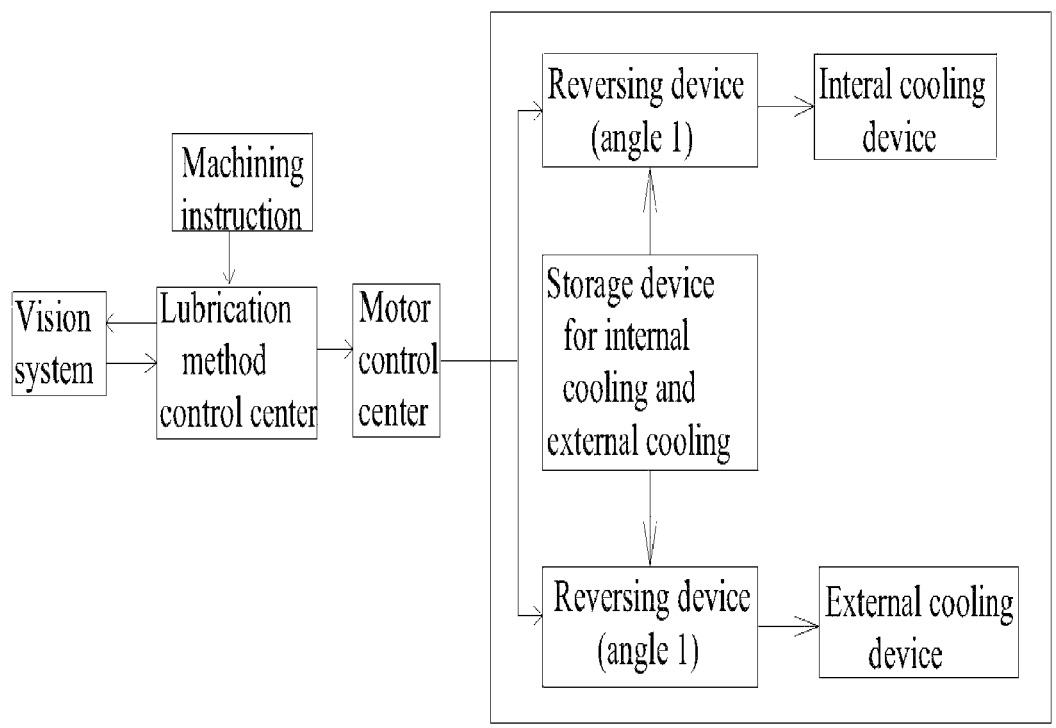
FIG. 15 is an block diagram of information transmission in an intelligent switching system for switching internal cooling and external cooling.

A block diagram of information transmission of the intelligent switching system for switching internal cooling and external cooling is as shown in FIG. 15. The camera I-1 is mounted at a position that is a same level as a cutter handle. At the beginning of machining, the lubrication mode control center I-6 may receive a machining instruction and control the vision system I to work. After it works, the vision system I transmits the collected image that the cutter that mills a workpiece to the lubrication mode control center I-6. By analyzing and processing the image that the cutter mills a workpiece, real-time milling depth data of the cutter is obtained. A milling depth threshold for switching lubrication modes of internal cooling and external cooling is set in the lubrication mode control center I-6. The lubrication mode control center I-6 may compare the real-time milling depth data of the cutter with the set milling depth threshold, obtain a lubrication mode under the current machining condition according to a comparative result, and transmit this result to the motor control center I-8 in the form of an analog signal. The motor control center I-8 is used to receive the analog signal that is transmitted by the lubrication mode control center I-6, where the analog signal is carried with the lubrication mode required under a current milling condition. The motor control center I-8 may analyze and process the analog signal, and control rotation of the reversing device II-2-18 by different quantities of pulse signals, so as to control angle rotation of the reversing block II-2-3 in the reversing device II-2 in the internal cooling and external cooling systems. So, switching of the flow direction of the cutting fluid between the internal-cooling-device pipeline A and the external-cooling device pipeline B is realized, which completes switching of the internal cooling and external cooling systems. The cutting fluid flows out from the cutting fluid storage device II-1 for internal cooling and external cooling. When the cutting fluid flows through the reversing device II-2, it may be determined the flow direction of the cutting fluid between the internal cooling device II-3 and the external cooling device II-2 according to an opened state or a closed state of the internal-cooling-device pipeline A and the external-cooling device pipeline B in the reversing device II-2, where the opened state or the closed state has been adjusted under an actual machining condition. So, it is realized that the switching of the most suitable lubrication mode in the current milling condition of the machine tool on the workpiece.

Figure 16:
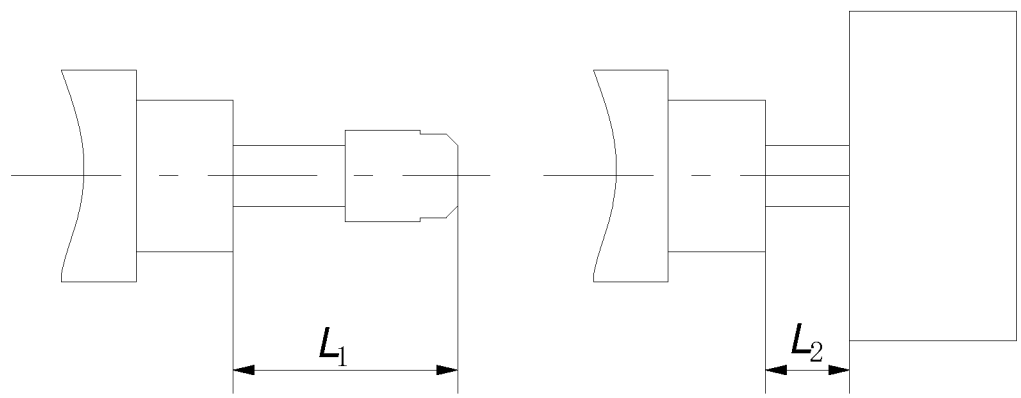
FIG. 16 is a diagram of state information of a cutter collected by a vision system.

The vision system I collects the real-time milling depth image that the cutter mills the workpiece by using a machining-point optical identification system. The vision system I is used to quickly acquire position information of the top end of the cutter and position information of the surface of the workpiece during the milling of the cutter, by identifying a light track of invisible light within a certain wavelength, in a case where the information interference is shielded and the machine tool communication is not needed. The invisible light is mapped to the cutter. The vision system I calculates coordinate data of the tail end of the current cutter to obtain current milling depth information. The real-time milling depth image that the cutter mills a workpiece, which is collected by the vision system, is divided into two parts. The first part is to collect a length $L_1$ from the cutter handle to the top end of the cutter; and the other part is to collect a length $L_2$ from the cutter handle to the surface of the milled workpiece. As shown in FIG. 16, before the milling machining of the machine tool starts, the machine tool needs to perform cutter replacement according to the shape, material and the like of the machined workpiece. The lengths of cutters are different, and the cutter length needs to be collected before the machining starts, that is, the length $L_1$ from the cutter handle to the top end of the cutter is collected. After the machining starts, the cutter length needs to be collected again, that is, the length $L_2$ from the cutter handle to the surface of the milled workpiece is collected. The milling depth L of the workpiece milled by the machine tool is determined by:

$$L = L_1 - L_2$$

Figure 17:
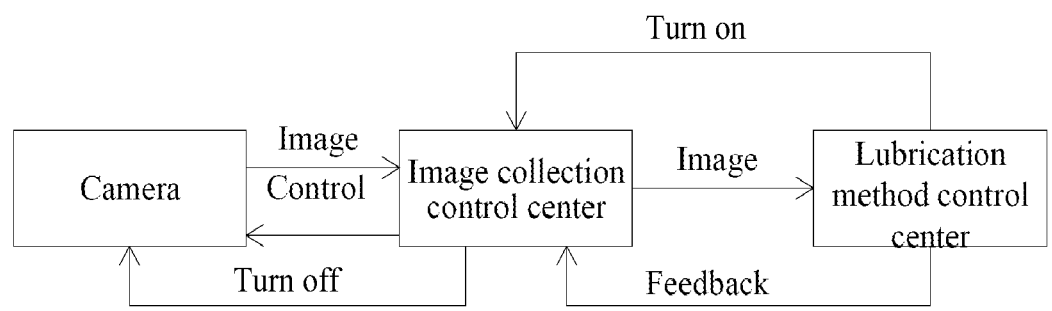
FIG. 17 is a flow block diagram of the state information of a cutter collected by a vision system.

A specific flow that the vision system I collects the cutter lengths $L_1$ and $L_2$ is as shown in FIG. 17. First, before the machining starts, the image collection control center I-4 may receive a turn-on instruction of the lubrication mode control center I-6 to control the camera I-1 to perform image collection for the first time, and may transmit a collected image to the lubrication mode control center I-6 through the second wireless transmission device I-7 and the first wireless transmission device I-5. The lubrication mode control center I-6 analyzes and processes the received image to obtain the length $L_1$ of the cutter itself. At the same time, the lubrication mode control center I-6 provides a feedback to the image collection control center I-4 through the second wireless transmission device I-7 to enable the camera I-1 to stop working. After the machining starts, the lubrication mode control center I-6 may transmit an image collection instruction for the second time to the image collection control center I-4. The image collection control center I-4 may control the camera I-1 to take a real-time machining image of the cutter, and may transmit a collected image to the lubrication mode control center I-6 through the second wireless transmission device I-7 and the first wireless transmission device I-5. The lubrication mode control center I-6 analyzes and processes the received image to obtain the real-time milling depth $L_2$ of the cutter. After the machining is completed, the lubrication mode control center I-6 provides a feedback to the image collection control center I-4 through the second wireless transmission device I-7 to enable the camera I-1 to stop working.

Figure 18:
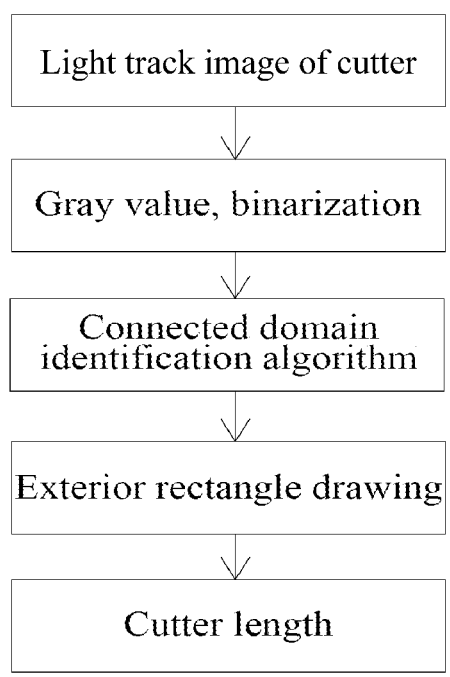
FIG. 18 is a flowchart of image analysis and processing of a vision system.

The system transmits an image that the cutter does not work, and the real-time image that the cutter mills a workpiece to the lubrication mode control center I-6 through the first wireless transmission device I-5. The lubrication mode control center I-6 firstly performs a series of preprocessing (such as gray-scale transformation and thresholding) on the images, so as to eliminate the interference of original pixels and improve the accuracy of numerical value analysis. Then, the lubrication mode control center I-6 uses a connected domain identification algorithm and exterior rectangle drawing to extract coordinates of key points of the cutter, so as to obtain the cutter length. According to the specific process that the vision system collects the cutter lengths $L_1$ and $L_2$, the cutter lengths $L_1$ and $L_2$ are obtained respectively. The calculation for a real-time milling depth when the cutter mills a workpiece is finally completed. The image analysis and processing process of the lubrication mode control center I-6 is as shown in FIG. 18.

Firstly, an image of the light track of the cutter is subjected to gray value processing. The camera takes an RGB color image, so the color image needs to be converted into a grayscale image. Term "RGB" refers to a red sub-pixel, a green sub-pixel and a blue sub-pixel. This is for the purpose of improving the image clarity and making the subsequent image processing more accurate. A calculation formula from an RGB image to a grayscale image is as follows:

$$g(x,y) = 0.3R(x,y) + 0.59G(x,y) + 0.11B(x,y)$$

Where g (x, y) represents a gray value of a pixel at the point (x, y) of the image, and R, G, and B respectively represent vector values of red, green, and blue sub-pixels of the pixel at the point (x, y).

The image of the light track that is subjected to the grayscale processing is continued to be simplified to a binary image with only black and white pixels. This is for the purpose of making the image clearer, simplifying the subsequent connected domain filtering and exterior rectangle drawing processes, and reducing the amount of calculation. A conversion relationship between the binary image and the gray-scale image is determined by a following formula:

$$f(x, y) = \begin{cases} 0, & g(x, y) \leq t \\ 255, & g(x, y) > t \end{cases}$$

Where f (x, y) represents the converted binary image, g (x, y) represents the grayscale image, and t represents a threshold value, which is a determination condition for pixel conversion and a key value of binarization. This value is determined by the mutual influence of three factors, i.e., an image pixel at the coordinate point (x, y), a gray value of this pixel, and characteristics of a grayscale environment of the domain of this point.

After the gray value processing and the binarization, the image needs to be subjected to connected domain identification, labeling and filtering. This disclosure uses a Two-pass method to perform the connected domain identification and labeling on the image. Firstly, matrix assignment in One-pass scan is performed to scan matrix data of the image row by row from top to bottom and from left to right, so as to assign a label value to each effective pixel. The image in this disclosure is four connected domain, and a formula of the assignment rule thereof is:

$$M(i, j) = \begin{cases} NewLabel, M(i-1, j) = M(i, j-1) = 0 \\ \min[M(i-1, j), M(i, j-1)], M(i-1, j) \neq 0 \,\&\, M(i, j-1) \neq 0 \\ M(i, j-1), M(i-1, j) = 0 \,\&\, M(i, j-1) \neq 0 \\ M(i-1, j), M(i-1, j) \neq 0 \,\&\, M(i, j-1) = 0 \end{cases}$$

Where M(i,j) represents a label value of a pixel in an i-th row and an j-th column. The One-pass scan process not only assigns values to pixels, but also summarizes domain-connected and value-unconnected label value into an equivalent array a[i]. After all the pixels of the matrix are assigned, the One-pass scan ends and the Two-pass scan starts. The Two-pass scan is performed row by row from top to bottom and from left to right. According to the equivalent array generated by the One-pass scan, the label values belonging to the same equivalent array are assigned with the smallest value in the array where the label values are located. If there is only a single element in the array, an ordinal value of an array is assigned to the label value, as shown in the following formula:

$$label = \begin{cases} \min\{a[i]\}, strlen(a) > 1 \\ i, strlen(a) = 1 \end{cases}$$

At this point, the connected domain identification and labeling performed by the Two-pass method is finished, and connected domain filtering on the image is started. By setting a lower limit B of the number of pixels in the connected domain, all connected domains whose pixel number is less than the lower limit B may be deleted.

Figure 19:
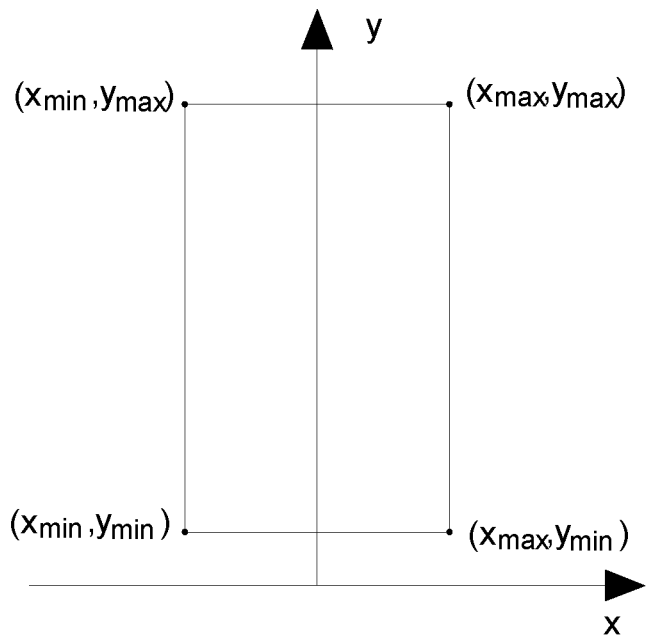
FIG. 19 shows a rectangle formed by boundary coordinates of a connected domain.
Figure 20A:
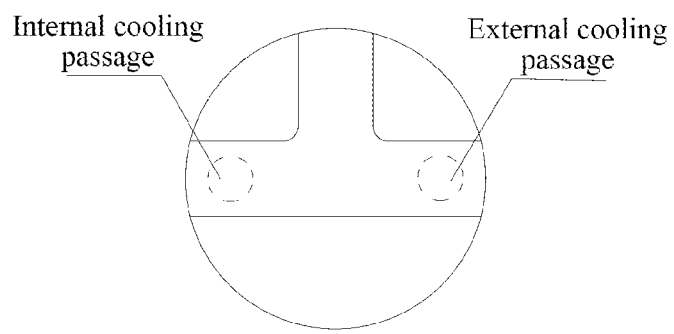
FIG. 20(a) shows a working state of a reversing device when a reversing block rotates 0 degree or 360 degrees.
Figure 20B:
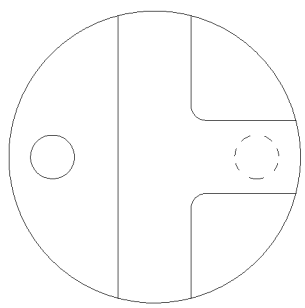
FIG. 20(b) shows a working state of a reversing device when a reversing block rotates 90 degrees.
Figure 20C:
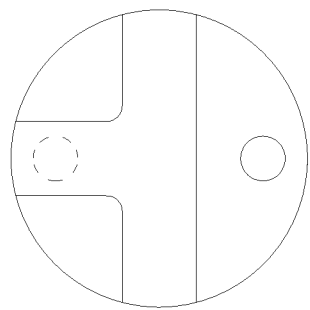
FIG. 20(c) shows a working state of a reversing device when a reversing block rotates 180 degrees.
Figure 20D:
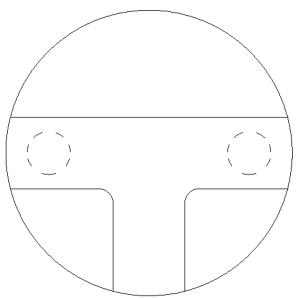
FIG. 20(d) shows a working state of a reversing device when a reversing block rotates 270 degrees.

After the connected domain identification, the exterior rectangle drawing needs to be performed. A target connected domain needs to be scanned row by row from left to right. A coordinate $(x_{i0}, y_{i0})$ of a start point and a coordinate $(x_{i1}, y_{i1})$ of an end point in the i-th row are recorded. Furthermore, the various coordinate values are respectively input into corresponding arrays. If the matrix of the target connected domain includes M row multiply N column, the following two arrays may be obtained.

$$X[0] = \{x_{10}, x_{20}, \ldots x_{M0}\}$$

$$X[1] = \{x_{11}, x_{21}, \ldots x_{M1}\}$$

Where X[0] is a set of abscissa values of the start points in rows of the connected domain, and X[1] is a set of abscissa values of end points in the rows of the connected domain. A maximum value Max{X[1]} and a minimum value Min{X[0]} are respectively taken for the two arrays, so as to obtain boundary values of the x-axis of the connected domain. The maximum and minimum values of the y-axis are $y_{10}$ and $y_{M0}$, respectively. According to the obtained boundary coordinates of the connected domain, the coordinates of the four vertices $(x_{min}, y_{min})$, $(x_{min}, y_{max})$, $(x_{max}, y_{max})$, $(x_{max}, y_{min})$ of the exterior rectangle can be obtained. The rectangle is as shown in FIG. 19. The length $L_1$ from the cutter handle to the top end of the cutter or the length $L_2$ from the cutter handle to the surface of the milled workpiece is an ordinate value of the rendered rectangle corresponding to the collection process. According to the specific flow that the vision system collects the cutter lengths $L_1$ and $L_2$, the length $L_1$ from the cutter handle to the top end of the cutter and the length $L_2$ from the cutter handle to the surface of the milled workpiece are obtained in sequence.

The lubrication mode control center is based on a following formula to obtain the real-time milling depth that the machine tool mills the workpiece. The formula is $L=L_1-L_2$. A milling depth threshold $L_3$ for switching internal cooling and external cooling lubrication modes is set in the lubrication mode control center I-6. The lubrication mode control center may compare the real-time milling depth data L of the cutter with the set milling depth value $L_3$. According to the comparative result, the lubrication mode in the current machining condition is obtained, and the result is transmitted to the motor control center in the form of an analog signal, which can be divided into the following types.

(1) When $L \leq L_3$, the cooling lubrication mode required for the current machining condition is external cooling. The lubrication mode control center I-6 may transmit the corresponding analog signal to the motor control center I-8 through the second wireless transmission device I-7. The motor control center I-8 may adjust the number of pulse signals, which is provided for a step-motor driver of the reversing device II-2, to $N_{270}°$ according to this analog signal carried with "switching to external cooling". The step-motor driver may control the reversing motor II-2-18 to rotate 270°, so that the reversing device II-2 is in an external cooling working state.

(2) When $L>L_3$, the cooling lubrication mode required for the current machining condition is internal cooling. The lubrication mode control center I-6 may transmit the corresponding analog signal to the motor control center I-8 through the second wireless transmission device I-7. The motor control center I-8 may adjust the number of pulse signals, which is provided for a step-motor driver of the reversing device II-2 to $N_{90}°$, according to this analog signal with "switching to internal cooling". The step-motor driver may control the reversing motor II-2-18 to rotate 90°, so that the reversing device II-2 is in an internal cooling working state.

(3) When there is no L, that is, when the device system for internal cooling and external cooling does not work at this time, the lubrication mode control center I-6 may transmit the corresponding analog signal to the motor control center I-8 through the second wireless transmission device I-7. The motor control center I-8 may adjust the number of pulse signals, which is provided for a step-motor driver of the reversing device II-2, to $N_0°$, $N_{180}°$ or $N_{360}°$ according to this analog signal carried with "switching to stop". The step-motor driver may control the reversing motor II-2-18 to rotate 0°, 180° or 360°, so that the reversing device II-2 is in a stop state.

The switching of the lubrication systems for internal cooling and external cooling is realized by the rotation angle of the reversing block II-2-3 in the reversing device II-2. For the angle adjustment of the reversing block II-2-3, the angle rotation of the reversing motor II-2-18 is realized by the number of pulse signals received by the driver of the reversing motor II-2-18 from the motor control center I-8. In this way, the angle rotation of the reversing block II-2-3 is controlled, and the internal cooling and the external cooling of the lubrication system can be switched.

Each step motor has its fixed step angle θ. The step angle θ is a mechanical angle rotated by a rotor in response to receiving one pulse signal when the step motor has no a reduction gear. The specific algorithm is represented by the following formula.

$$\theta = \frac{360°}{n_c \times n_p}$$

Where $n_c$ is the number of teeth of the rotor of the step motor, and $n_c$ is the number of beats of the step motor when operating.

The number $N_{360°}$ of pulse signals required when the step motor rotates one circle is determined by the following formula.

$$N_{360°} = \frac{360°}{\theta}$$

The number $N_r$ of pulse signals required when the step motor rotates any angle is determined by the following formula.

$$N_r = \frac{\theta_r}{\theta}$$

Where $\theta_r$ is any angle of rotation of the step motor.

The above formula can be transformed into $\theta_r = N_r \times \theta$.

As such, according to the above formula, the rotation angle of the reversing block II-2-3 in the reversing device II-2 is adjusted by adjusting the number $N_r$ of the pulse signals provided by the motor control center I-8 to the step-motor driver of the reversing motor of the reversing device II-2. So, switching of the internal cooling and external cooling lubrication system (i.e., intelligent switching system for switching internal cooling and external cooling) is realized.

According to the shape of the reversing block designed in the present disclosure, the reversing device II-2 has four working states as shown in FIG. 20(*a*), FIG. 20(*b*), FIG. 20(*c*), and FIG. 20(*d*).

(1) As shown in FIG. 20(*a*), the working state of the reversing device II-2 at this time is that: the internal cooling passage A and the external cooling passage A are closed; the internal cooling and external cooling lubrication system is in a stop state; and the rotation angle of the reversing block II-2-3 may be 0° or 360°. When the angle of the reversing block II-2-3 is 0°, that is, when the reversing motor II-2-18 does not rotate, the motor control center I-8 does not provide the pulse signals to the step-motor driver. When the angle of the reversing block is 360°, that is, when the reversing motor II-2-18 rotates one cycle, the number of pulse signals provided by the motor control center I-8 to the step-motor driver at this time is determined by the following formula.

$$N_{360°} = \frac{360°}{\theta}$$

(2) As shown in FIG. 20(*b*), the working state of the reversing device II-2 at this time is that: the internal cooling passage A is opened and the external cooling passage B is closed; the internal cooling and external cooling lubrication system is switched to the internal cooling working state; and the rotation angle of the reversing block II-2-3 is 90°, that is, the reversing motor II-2-18 rotates 90°. At this time, the number of pulse signals provided by the motor control center I-8 to the step-motor driver is determined by the following formula.

$$N_{90°} = \frac{90°}{\theta}$$

(3) As shown in FIG. 20(*c*), the working state of the reversing device II-2 at this time is that: the internal cooling passage A and the external cooling passage B are both closed; the internal cooling and external cooling lubrication system is switched to the stop state; and the rotation angle of the reversing block II-2-3 is 180°. When the angle of the reversing block II-2-3 is 180°, that is, when the reversing motor II-2-18 rotates 180°, the number of pulse signals provided by the motor control center I-8 to the step-motor driver at this time is determined by the following formula.

$$N_{180°} = \frac{180°}{\theta}$$

(4) As shown in FIG. 20(*d*), the working state of the reversing device II-2 at this time is that: the external cooling passage B is opened; the internal cooling passage A is closed; and the internal cooling and external cooling lubrication system is switched to the external cooling working state. The rotation angle of the reversing block II-2-3 is 270°, that is, the reversing motor II-2-18 rotates 270°. At this time, the number of pulse signals provided by the motor control center I-8 to the step-motor driver is determined by the following formula.

$$N_{270°} = \frac{270°}{\theta}$$

When N is 0°, $N_{180°}$ or $N_{360°}$, the internal cooling and external cooling lubrication system is in a pause state. When N is $N_{90°}$, the internal cooling and external cooling lubrication system is in the internal cooling working state. When N is $N_{270°}$, the internal cooling and external cooling lubrication system is in the external cooling working state. The number of pulse signals provided by the motor control center to the step-motor driver of the reversing device can be controlled to be 0°, ($N_{180°}$ or $N_{360°}$), $N_{90°}$, $N_{270°}$, so as to realize free switching between internal cooling and external cooling of the disclosure.

Figure 21A:
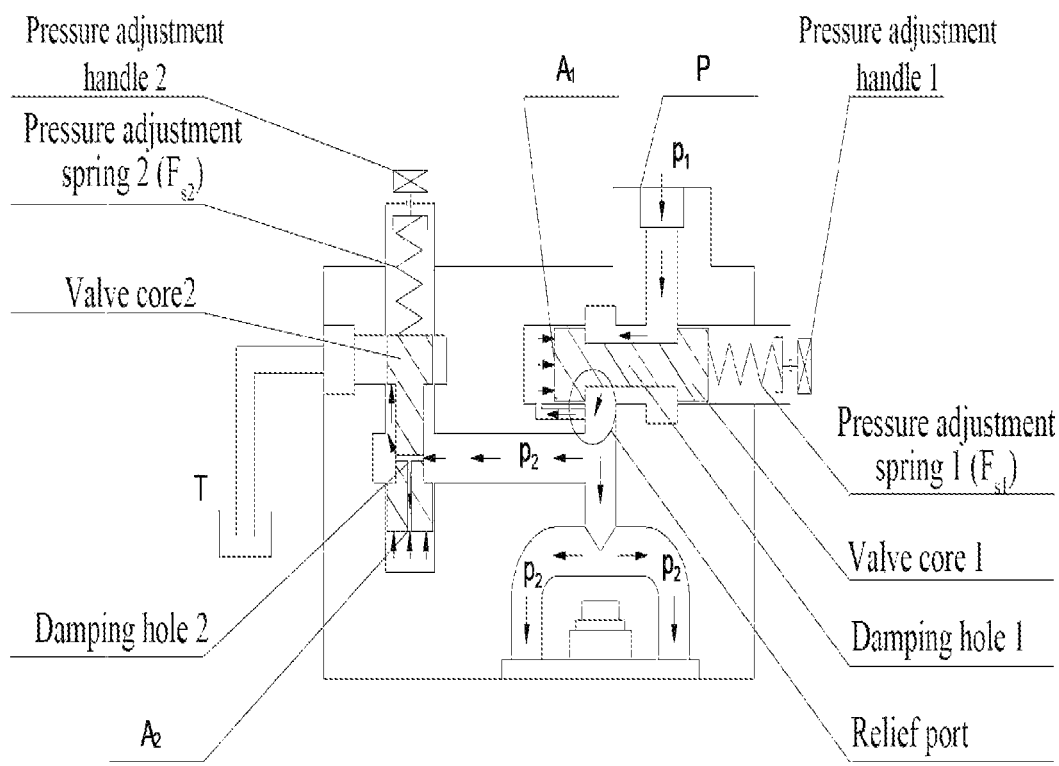
FIG. 21(a) is a working principle diagram before decompression of a reversing device.

The working principle of the reversing device II-2 of this disclosure is as shown in FIG. 21(*a*), FIG. 21(*b*) and FIG. 21(*c*). As shown in FIG. 21(*a*), when the internal cooling pipeline A or the external cooling pipeline B is opened, the cutting fluid with pressure $p_1$ enters the decompression working cavity of the reversing device II-2 from a fluid inlet P, and enters a branch for outputting the hydraulic pressure through a relief port. Since the cutting fluid has pressure loss when passing through a gap of the relief port, a pressure $p_2$ of the cutting fluid after passing through the relief port is less than the pressure $p_1$ of the cutting fluid at the fluid inlet. After the cutting fluid passes through the relief port, a part of the cutting fluid flows into a lower cavity of a first valve core II-2-16 through a side through hole, which will generate an upward thrust $p_2 A_1$. Where $A_1$ is an effective working area of the left end of the first valve core II-2-16. When a rightward thrust generated by this part of the cutting fluid due to acting on the bottom end of the first valve core II-2-16 is less than the pre-tightening force $F_{s1}$ of the first pressure adjustment spring II-2-12, the first valve core II-2-16 is at the leftmost position, so that the relief port is fully opened, which does not play a role in decompression. At this time, $p_1 \approx p_2$.

In addition, after passing through the relief port, the cutting fluid with the pressure $p_2$ may flow to the left, and flow toward a lower end of a second valve core II-2-17 after passing through a second valve core II-2-17 and a damping hole 2, thereby resulting in an upward thrust force $p_2A_2$. Where $A_2$ is an effective working area of the lower end of the second valve core II-2-17. The pre-tightening force of the second pressure adjustment spring II-2-13 at the upper end of the second valve core II-2-17 is $F_{s2}$. The left outlet is closed and the overflow device does not work, when an axial thrust $p_2A_2$ generated by the pressure $p_2$ of the cutting fluid is less than the pre-tightening force $F_{s2}$ of the spring, the gravity G of the second valve core II-2-17, as well as a friction force $F_f$ between the second valve core II-2-17 and the inner cavity of the reversing device.

Figure 21B:
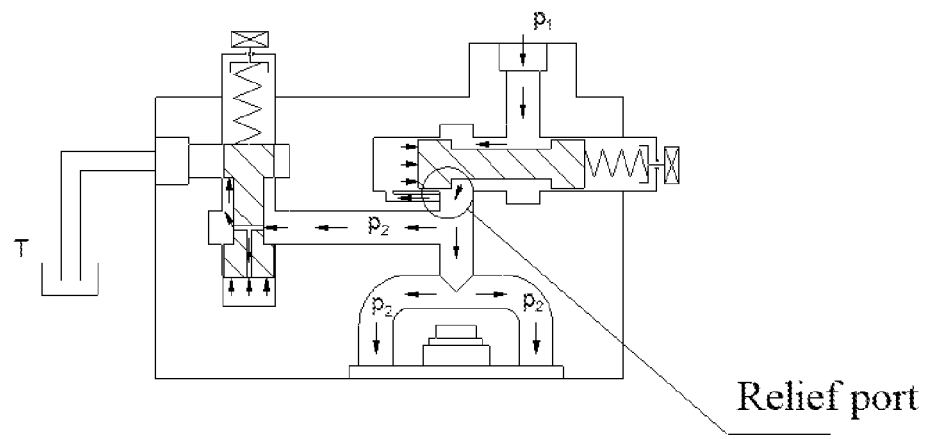
FIG. 21(b) is a working principle diagram during decompression of a reversing device.

When the internal cooling pipe A or the external cooling pipe B is opened, if the pressure $p_2$ of the cutting fluid after passing through the relief port is greater than the pre-tightening force $F_{s1}$ of the first pressure adjustment spring II-2-12, that is, when $p_2 \geq F_{s1}$, the first valve core II-2-16 overcomes the pre-tightening force of the first pressure adjustment spring II-2-12 and moves to the right, under the pressure action of the cutting fluid in the left cavity, so that the relief port is minimized, as shown in FIG. 21(b). At this time, the pressure loss, which is generated by the cutting fluid when passing through the relief port, reduces the pressure $p_2$ of the cutting fluid passing through the relief port, and stabilizes the pressure $p_2$ within a counter-force range of the first pressure adjustment spring II-2-12. According to a balance relationship, which is represented by $p_2A_1=K_1(X_{01}+\Delta x)$, between an outlet pressure and the first pressure adjustment spring II-2-12, the pressure $p_2$ of the cutting fluid after passing through the relief port can be determined by the following formula.

$$p_2 = \frac{k_1(x_{01} + \Delta x)}{A_1}$$

Where $k_1$ is a spring stiffness of the first pressure adjustment spring II-2-12, $x_{01}$ is a pre-compression amount of the first pressure adjustment spring II-2-12, and $\Delta x$ is a displacement variable of the relief port.

It can be seen from the above formula that, when the displacement variable $\Delta x$ of the relief port is much less than the pre-compression amount $x_{01}$ of the first pressure adjustment spring II-2-12, the pressure $p_2$ of the cutting fluid after passing through the relief port can be basically kept stable. The pre-tightening force $F_{s1}$ of the first pressure adjustment spring II-2-12 can be adjusted by adjusting the first pressure adjustment nut II-2-6, and thus the pressure $p_2$ of the cutting fluid at the relief port can be adjusted.

At this time, the axial thrust $p_2A_2$ generated by the pressure $p_2$ of the cutting fluid is less than the pre-tightening force $F_{s2}$ of the spring, the gravity G of the second valve core II-2-17 and the friction force $F_f$ between the second valve core II-2-17 and the inner cavity of the reversing device. In this way, the left outlet is closed and the overflow device does not work.

Figure 21C:
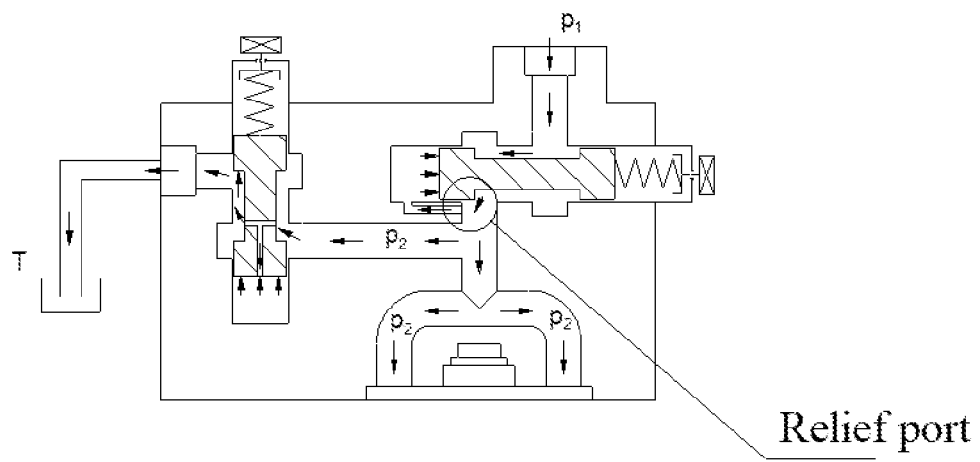
FIG. 21(c) is a working principle diagram during overflowing of a reversing device.

As shown in FIG. 21(c), when the internal cooling pipeline A and the external cooling pipeline B are closed, the pressure $p_2$ of the cutting fluid after passing through the relief port will increase. At this time, the cavity where the second valve core II-2-17 is located will have the following situations in sequence.

(1) The pressure $p_2$ of the cutting fluid increases, so that the second valve core II-2-17 may start to move upward under the thrust of the cutting fluid, when the thrust $p_2A_2$ that the cutting fluid acts on the bottom end of the second valve core II-2-17 increases to just overcome the pre-tightening force $F_{s2}$ of the spring, the gravity G of the second valve core II-2-17 and the friction force $F_f$ between the second valve core II-2-17 and the inner cavity of the reversing device. According to the force balance relationship of the second valve core II-2-17, which is represented by $p_kA_2=F_{s2}+G$, a critical opening pressure of a valve port of the second valve core is determined by the following formula.

$$p_k = \frac{F_{s2} + G + F_f}{A_2} = \frac{k_2 x_{02} + G + F_f}{A_2}$$

Where $k_2$ is the spring stiffness of the second pressure adjustment spring II-2-13, and $x_{02}$ is the pre-tightening force of the second pressure adjustment spring II-2-13.

(2) The pressure $p_2$ of the cutting fluid continues to increase, the second valve core II-2-17 may move upward. The valve port is opened, and the cutting fluid flows into the cutting fluid storage device through the left outlet. That is, the overflow is started. When the second valve core II-2-17 moves upward to a certain balance position, the second pressure adjustment spring II-2-13 may be compressed by a certain distance x. At this time, the force balance equation of the second valve core II-2-17 becomes the following equation.

$$p_2A_2 = k(x_{02}+x) + G + F_f$$

That is, the pressure $p_2$ of the cutting fluid at this time is determined by the following equation.

$$p_2 = \frac{k_2(x_{02}+x) + G + F_f}{A_2}$$

It can be seen from the above formula that, when the overflow occurs, the pressure $p_2$ of the cutting fluid at this time is not affected by changes in a flow rate, and is affected by the spring stiffness and the pre-tightening force of the second pressure adjustment spring II-2-13, the gravity of the second valve core II-2-17 as well as the sliding friction force. The spring stiffness of the second pressure adjustment spring II-2-13, the gravity of the second valve core II-2-17 and the sliding friction force are constant values after the reversing device is constructed, so the pressure $p_2$, i.e., an overflow pressure, of the cutting fluid at this time can be adjusted by adjusting the pre-tightening force $F_{s2}$ of the second pressure adjustment spring II-2-13. By the adjustment of the overflow pressure, the overflow pressure can be less than a maximum pressure that the reversing device can withstand, so as to achieve a protection effect on the reversing device.

The supply to the external cooling system III of the present disclosure adopts a minimal quantity lubrication mode, and the supply to the internal cooling system II adopts the traditional pouring type. The schematic diagram of the internal cooling and external cooling lubrication system of this embodiment is as shown in FIG. 22.

The cutting fluid storage device II-1 for internal cooling and external cooling includes a cutting fluid storage tank 1, a hydraulic pump 2, a pressure adjustment valve 3, a throttle valve 4, an overflow valve 5 and a cutting fluid recovery tank 6.

The compressed air storage device for external cooling III-1 includes an air compressor 7, a filter 8, an air storage tank 9, a pressure gauge 10, a pressure adjustment valve 11, a throttle valve 12, an overflow valve 13, and a compressed air recovery tank 14.

The compressed air produced by the air compressor 7 is stored in the air storage tank 9 after passing through the filter 8. And the pressure in the air storage tank 9 is detected by the pressure gauge 10. The compressed air flows out of the air storage tank 9, sequentially passes through the pressure adjustment valve 11 and the throttle valve 12, and finally enters an air pipe of the nozzle in the external cooling device. The overflow valve 13 and the compressed air recovery device 14 constitute a protection loop. Under the action of the hydraulic pump 2, the cutting fluid in the cutting fluid storage tank 1 sequentially passes through the pressure adjustment valve 3 and the throttle valve 4, and flows to the reversing device. The reversing device has built-in internal and external cooling passages. The cutting fluid may be conveyed through the internal cooling passage or the external cooling passage to the main-spindle pipeline in the internal cooling device or the nozzle liquid pipe in the external cooling device, according to an actual machining condition. The overflow valve 5 and the cutting fluid recovery tank 6 constitute a protection loop.

The information transmission modes are all wireless transmission, and the internet can be used for transmission, such as WIFI, Bluetooth, UWB, ZigBee, GPRS, 2G, 3G, and 4G. The above-mentioned wireless transmission technologies are all mature technologies, and all have complete working modules. According to the actual working conditions, a more suitable wireless technology is selected, so as to provide an information transmission technology, which can be used directly, for the system of the present disclosure.

What is claimed is:

1. An intelligent switching system for switching internal cooling and external cooling based on minimal quantity lubrication, wherein the intelligent switching system comprises a vision system, a cooling system, and a control system;

the vision system is configured to monitor a milling state of a cutter of a machine tool in real time, collect a real-time milling depth image that the cutter mills a workpiece, and transmit the real-time milling depth image that the cutter mills the workpiece to the control system through a first wireless transmission device;

the control system comprises a lubrication mode control center, a second wireless transmission device, a motor control center and a third wireless transmission device; the lubrication mode control center is connected with the second wireless transmission device; the second wireless transmission device is configured to receive a real-time image transmitted by an image collection control center; the lubrication mode control center is configured to analyze and process the real-time milling depth image that the cutter mills the workpiece to obtain real-time milling depth data of the cutter, and configured to compare the real-time milling depth data with a preset milling depth threshold to obtain a lubrication mode in current a machining condition based on a comparative result; the third wireless transmission device is configured to receive a signal sent by the lubrication mode control center; the motor control center is configured to analyze and process the signal to obtain a control instruction; and the third wireless transmission device transmits the control instruction to the cooling system;

the cooling system is configured to execute a command of switching the internal cooling and the external cooling sent by the motor control center, so as to realize the internal cooling and the external cooling for the machine tool.

2. The intelligent switching system for switching internal cooling and external cooling based on minimal quantity lubrication according to claim 1, wherein the vision system comprises a self-stabilization platform, and a camera, a lighting device, the image collection control center and the first wireless transmission device which are mounted on the self-stabilization platform; the camera is configured to photograph the real-time milling depth image of the cutter mills the workpiece; the camera is communicated with the image collection control center; the image collection control center is coupled with the first wireless transmission device; and the lighting device is mounted above the camera.

3. The intelligent switching system for switching internal cooling and external cooling based on minimal quantity lubrication according to claim 1, wherein the cooling system comprises a cutting fluid storage device for the internal cooling and the external cooling, a reversing device, an internal cooling device, an external cooling device, and a compressed air storage device for the external cooling; the cutting fluid storage device for the internal cooling and the external cooling is connected with the internal cooling device and the external cooling device respectively through the reversing device; the external cooling device is further connected with the compressed air storage device for the external cooling; and the compressed air storage device for the external cooling is configured to convey compressed air to the external cooling device through a pipeline.

4. The intelligent switching system for switching internal cooling and external cooling based on minimal quantity lubrication according to claim 3, wherein the reversing device comprises a body; the body is provided with a cooling fluid main pipeline, an internal-cooling-device pipeline A, an external-cooling device pipeline B, and an overflow pipeline; the internal-cooling-device pipeline A, the external-cooling device pipeline B, and the overflow pipeline are communicated with the cooling fluid main pipeline; the cooling fluid main pipeline is communicated with the cutting fluid storage device for the internal cooling and external cooling; the internal-cooling-device pipeline A and the external-cooling device pipeline B are cooperated with a reversing block; and the reversing block is driven by a motor to close or open the internal-cooling-device pipeline A and/or the external-cooling device pipeline B.

5. The intelligent switching system for switching internal cooling and external cooling based on minimal quantity lubrication according to claim 4, wherein the cooling fluid main pipeline and the overflow pipeline are each mounted with a cutting fluid pressure adjustment device; the cutting fluid pressure adjustment device comprises a valve core, a spring, a pressure adjustment nut, and an adjustment bushing; the adjustment bushing has a thread, and is mounted on the body of the reversing device through the threaded; the pressure adjustment nut is mounted on the adjustment bushing; the adjustment screw, a spring seat, and the pressure adjustment spring are sequentially mounted in the adjustment bushing; and a tail end of the pressure adjustment spring is mounted on a spring base and is connected with the valve core.

6. The intelligent switching system for switching internal cooling and external cooling based on minimal quantity lubrication according to claim 4, wherein the reversing block comprises a vertical part and three horizontal parts; the vertical part is connected with a reversing motor coupling; when the reversing block is rotated, the horizontal parts are cooperated with the internal-cooling-device pipeline A or/and the external-cooling device pipeline B.

7. The intelligent switching system for switching internal cooling and external cooling based on minimal quantity lubrication according to claim 1, wherein the internal cooling device comprises a rotary joint, an internal cooling plug, a plug inner-sleeve, and an internal cooling joint;
the internal cooling plug is mounted in a machine-tool main spindle; the plug inner-sleeve is mounted in the internal cooling plug through inner-sleeve bearings; a right one of the inner-sleeve bearings is fixed at the plug inner-sleeve through a snap ring; the internal cooling joint is mounted in the machine-tool main spindle through a bearing internal-cooling-joint bearing; and the machine-tool main spindle is mounted in a housing of the machine-tool main spindle through a machine-tool main-spindle upper bearing and a machine-tool main-spindle lower bearing.

8. The intelligent switching system for switching internal cooling and external cooling based on minimal quantity lubrication according to claim 1, wherein the external cooling device comprises an X-axis telescopic arm module, a Y-axis telescopic arm module, a Z-axis telescopic arm module, and a sprayer-nozzle angle module; the Y-axis telescopic arm module is mounted on the X-axis telescopic arm module; the Z-axis telescopic arm module is mounted on the Y-axis telescopic arm module; and the sprayer-nozzle angle module is mounted on the Z-axis telescopic arm module.

9. A method for cooling a machine tool, the method being carried out by the intelligent switching system for switching internal cooling and external cooling based on minimal quantity lubrication according to claim 1, wherein the method comprises:
receiving a machining instruction and controlling the vision system to operate via the lubrication mode control center at a beginning of machining; transmitting the real-time milling depth image that the cutter mills the workpiece to the lubrication mode control center via the vision system after the vision system operates; obtaining the real-time milling depth data of the cutter by analyzing and processing the real-time milling depth image that the cutter mills the workpiece; comparing the real-time milling depth data of the cutter with the preset milling depth threshold via the lubrication mode control center, wherein the preset milling depth threshold for switching an internal cooling lubrication mode and an external cooling lubrication mode is set in the lubrication mode control center; obtaining a lubrication mode in the current machining condition based on the comparative result via the lubrication mode control center; and transmitting the comparative result to the motor control center in a form of an analog signal via the lubrication mode control center;
via the motor control center, receiving the analog signal that is transmitted by the lubrication mode control center, wherein the analog signal carries the lubrication mode required in the current milling condition; analyzing and processing the analog signal; controlling a rotation of a reversing device in manner of different quantities of pulse signals to control angle rotation of a reversing block of the reversing device of the cooling system, such that a switching of a flow direction of a cutting fluid between an internal-cooling-device pipeline A and an external-cooling device pipeline B is enabled, and a switching of the cooling system is enabled;
enabling the cutting fluid to flow out from a cutting fluid storage device for internal cooling and external cooling; determining another flow direction of the cutting fluid between an internal cooling device and an external cooling device based on an open state or a close state of the internal-cooling-device pipeline A and the external-cooling device pipeline B in the reversing device, when the cutting fluid flows through the reversing device, wherein the open state or the close state is adjusted according to an actual machining condition; such that a switching of a most suitable lubrication mode in the current milling condition of the machine tool on the workpiece is enabled.

10. The method according to claim 9, wherein
collecting the real-time milling depth image that the cutter mills the workpiece via the vision system by using a machining-point optical identification system; acquiring position information of a top end of the cutter and position information of a surface of the workpiece when the cutter mills via the vision system, by identifying a light track of invisible light with a certain wavelength, wherein the invisible light is mapped to the cutter; calculating current coordinate data of a tail end of the cutter to obtain current milling depth information via the vision system, wherein the real-time milling depth image that the cutter mills the workpiece, which is collected by the vision system, is divided into two parts: a first part is a length $L_1$ from a handle of the cutter to a top end of the cutter, and an other part is a length $L_2$ from the handle of the cutter to the surface of the workpiece that is milled; a milling depth L of the workpiece that is milled by the machine tool is determined by $L=L_1-L_2$.

* * * * *